United States Patent
Kang et al.

(10) Patent No.: US 10,802,622 B2
(45) Date of Patent: Oct. 13, 2020

(54) ELECTRONIC DEVICE AND METHOD FOR CONTROLLING SAME

(71) Applicant: Samsung Electronics Co., Ltd., Gyeonggi-do (KR)

(72) Inventors: Doo-Suk Kang, Gyeonggi-do (KR); Geon-Soo Kim, Gyeonggi-do (KR); Kyu-Hong Kim, Gyeonggi-do (KR); Bo-Kun Choi, Seoul (KR); So-Young Kim, Gyeonggi-do (KR); Yo-Han Lee, Gyeonggi-do (KR); Seung-Min Choi, Gyeonggi-do (KR); Jong-Wu Baek, Gyeongsangbuk-do (KR); Yong-Joon Jeon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/336,399

(22) PCT Filed: Sep. 14, 2017

(86) PCT No.: PCT/KR2017/010098
§ 371 (c)(1),
(2) Date: Mar. 25, 2019

(87) PCT Pub. No.: WO2018/056641
PCT Pub. Date: Mar. 29, 2018

(65) Prior Publication Data
US 2019/0310723 A1  Oct. 10, 2019

(30) Foreign Application Priority Data
Sep. 23, 2016 (KR) .................. 10-2016-0122347

(51) Int. Cl.
*G06F 3/041* (2006.01)
*H04W 4/80* (2018.01)
(Continued)

(52) U.S. Cl.
CPC ............ *G06F 3/041* (2013.01); *G06F 3/0483* (2013.01); *G06F 3/0488* (2013.01); *G06F 21/32* (2013.01); *G06Q 20/32* (2013.01); *G06Q 20/40* (2013.01); *G06Q 20/40145* (2013.01); *H04N 21/2387* (2013.01); *H04W 4/00* (2013.01); *H04W 4/80* (2018.02)

(58) Field of Classification Search
CPC ...... G06F 3/041; G06F 3/0483; G06F 3/0488; G06F 21/32; G06F 3/044;
(Continued)

(56) References Cited

U.S. PATENT DOCUMENTS

2010/0027854 A1*  2/2010  Chatterjee ............... G06F 3/016
                                                          382/124
2011/0054837 A1   3/2011  Ikeda
(Continued)

FOREIGN PATENT DOCUMENTS

KR    10-2011-0086502    7/2011
KR    1020120023339      3/2012
(Continued)

OTHER PUBLICATIONS

PCT/ISA/210 Search Report issued on PCT/KR2017/010098 (pp. 7).
PCT/ISA/237 Written Opinion issued on PCT/KR2017/010098 (pp. 9).

*Primary Examiner* — Premal R Patel
(74) *Attorney, Agent, or Firm* — The Farrell Law Firm, P.C.

(57) ABSTRACT

An electronic device is provided that includes a touch screen display; a pressure sensor; at least one processor configured to receive a user input for performing a function for a selected period of time after execution of at least one application program, to detect a pressure regarding the touch screen display for the selected period of time using the pressure sensor, and to execute at least one selected from pausing the execution of the function, resuming the same, and restarting the same at least partially on the basis of the detected pressure when a selected pressure level is detected by the pressure sensor for the selected period of time.

15 Claims, 26 Drawing Sheets

(51) Int. Cl.
  *G06F 3/0483* (2013.01)
  *G06F 3/0488* (2013.01)
  *G06F 21/32* (2013.01)
  *G06Q 20/32* (2012.01)
  *G06Q 20/40* (2012.01)
  *H04N 21/2387* (2011.01)
  *H04W 4/00* (2018.01)

(58) Field of Classification Search
  CPC . G06F 2203/04105; G06F 2203/04106; G06F 3/04142; H04W 4/00; H04W 4/80; G06Q 20/40; G06Q 20/32; G06Q 20/40145; H04N 21/2387; H04N 21/4396; H04N 21/42224; H04N 21/47217
  See application file for complete search history.

(56) References Cited

U.S. PATENT DOCUMENTS

| | | |
|---|---|---|
| 2011/0141052 A1 | 6/2011 | Bernstein et al. |
| 2012/0092293 A1* | 4/2012 | Ganapathi .......... G02B 26/0833 345/174 |
| 2012/0105358 A1 | 5/2012 | Momeyer et al. |
| 2012/0274662 A1 | 11/2012 | Kim et al. |
| 2013/0187883 A1 | 7/2013 | Lim |
| 2013/0314364 A1* | 11/2013 | Nicholson ........... G06F 3/04883 345/174 |
| 2015/0067563 A1 | 3/2015 | Bernstein et al. |
| 2015/0268802 A1* | 9/2015 | Kim .................... G06F 3/04842 715/763 |
| 2016/0018941 A1 | 1/2016 | Kim et al. |
| 2016/0062530 A1 | 3/2016 | Huppi et al. |
| 2016/0247144 A1 | 8/2016 | Oh et al. |
| 2017/0032168 A1* | 2/2017 | Kim ....................... G06F 3/0414 |

FOREIGN PATENT DOCUMENTS

| | | |
|---|---|---|
| KR | 1020130088861 | 8/2013 |
| KR | 1020150122014 | 10/2015 |
| KR | 1020160009976 | 1/2016 |
| KR | 1020160073132 | 6/2016 |
| KR | 1020160099464 | 8/2016 |

* cited by examiner

| IPUT TYPE | INPUT STRENGTH | DURATION OF OPERATION |
|---|---|---|
| FIRST FORCE | | 5 SECONDS |
| SECOND FORCE | | 10 SECONDS |
| THIRD FORCE | | 30 SECONDS |

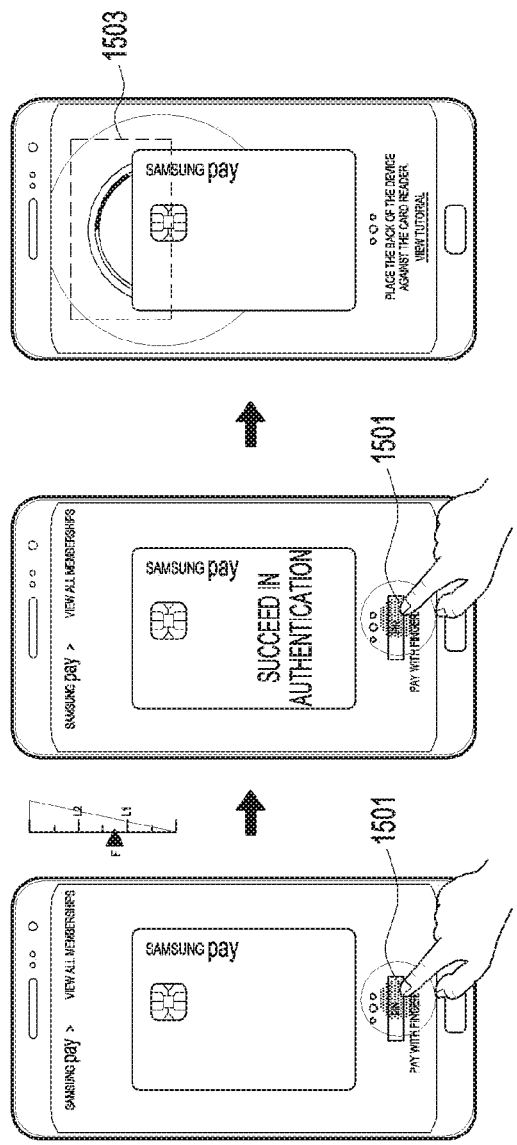

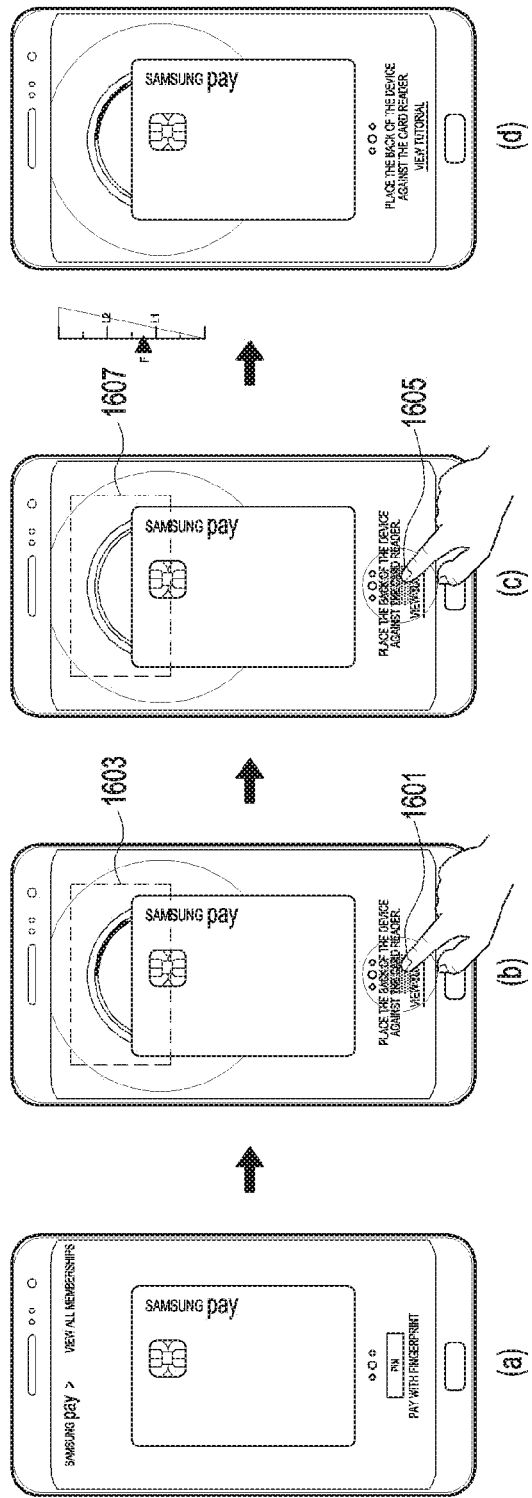

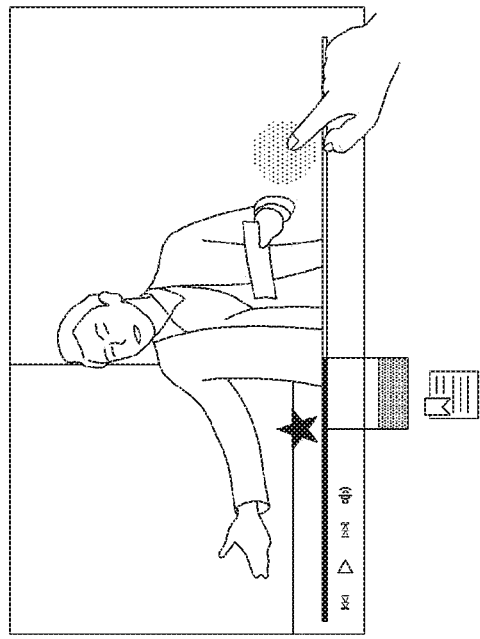
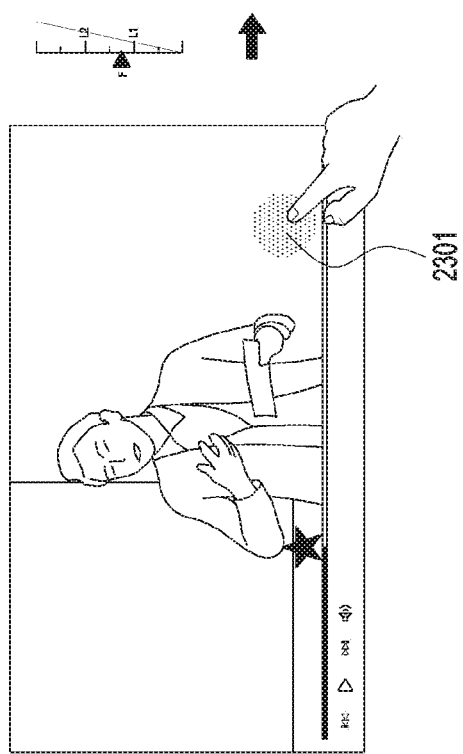
FIG.23B
FIG.23A

ELECTRONIC DEVICE AND METHOD FOR CONTROLLING SAME

PRIORITY

This application is a National Phase Entry of PCT International Application No. PCT/KR2017/010098, which was filed on Sep. 14, 2017, and claims priority to Korean Patent Application No. 10-2016-0122347, which was filed on Sep. 23, 2016, the contents of which are incorporated herein by reference.

BACKGROUND

1. Field

Various embodiments relate to an electronic device and a method for controlling the same in which the electronic device is controlled using a user's pressure input.

2. Description of the Related Art

With the development of electronic technologies, various types of electronic products have been developed and distributed. In particular, an electronic device having a variety of functions, such as a smartphone, a tablet personal computer (PC), or the like has recently come into wide use. There is also an attempt to provide various services of an electronic device by using a user's pressure input as well as a touch input.

SUMMARY

Although various input schemes such as a voice input, a touch input, and/or a pressure input for controlling an operation of an electronic device have been developed, only a few electronic devices have been developed to provide services by applying the pressure input.

A technique for controlling an operation of an electronic device through a pressure input has recently started being applied to the electronic device, and thus a user needs to previously learn the operation of the electronic device corresponding to the pressure input to control the operation of the electronic device. Consequently, the user has to learn the pressure input scheme as well as the existing input schemes applied to the electronic device, increasing the amount of learning required for the user to use the electronic device.

Various embodiments of the present disclosure provide an electronic device and a method of controlling the same in which various services using a pressure input are provided and learning required for a user is minimized when the user controls the electronic device by using the pressure input. For example, various embodiments of the present disclosure may provide an electronic device and a method of controlling the same in which learning required for the user may be minimized by improving usability of the electronic device based on an intuitive user interface (UI)/user experience (UX) corresponding to characteristics of the pressure input.

According to various embodiments of the disclosure, an electronic device includes a housing including a first surface facing in a first direction and a second surface facing in a second direction that is opposite to the first direction, a touch screen display located between the first surface and the second surface and exposed through the first surface, a biometric sensor located between the first surface and the second surface and exposed through the housing, a pressure sensor located between the first surface and the second surface and configured to detect a pressure applied by an external object to the touch screen display, a wireless communication circuit configured to transmit and receive a short-range radio signal, at least one processor electrically connected to the touch screen display, the biometric sensor, the pressure sensor, and the wireless communication circuit, and a memory electrically connected to the processor, the memory storing at least one application program configured to execute payment by transmitting a first signal by using the wireless communication circuit, in which the memory stores one or more instructions that are configured to, when executed, cause the processor to execute the application program, to receive biometric data by using the biometric sensor after executing the application program, to transmit the first signal by using the wireless communication circuit during a selected period after receiving the biometric data, to detect the pressure applied to the touch screen display during the selected period by using the pressure sensor, and to perform at least one of pause, resumption, or restart of transmission of the first signal at least partially based on the detected pressure when a selected pressure level is detected by the pressure sensor during the selected period.

According to various embodiments of the disclosure, an electronic device includes a housing including a first surface facing in a first direction and a second surface facing in a second direction that is opposite to the first direction, a touch screen display located between the first surface and the second surface and exposed through the first surface, a pressure sensor configured to detect a pressure applied by an external object to the touch screen display, at least one processor electrically connected to the touch screen display and the pressure sensor, and a memory electrically connected to the processor, the memory storing at least one application program configured to execute at least one function regarding an image or a sound source, in which the memory stores one or more instructions that are configured to, when executed, cause the processor to execute the application program, to detect the pressure applied to the touch screen display by using the pressure sensor after executing the application program, and to perform at least one of pause, resumption, or restart of transmission of the first signal at least partially based on the detected pressure when a selected pressure level is detected by the pressure sensor.

The electronic device and the method of controlling the same according to various embodiments of the present disclosure may improve usability of the electronic device by providing the intuitive UI/UX corresponding to the characteristics of the pressure input to minimize learning required for the user when the user controls the electronic device by using the pressure input.

BRIEF DESCRIPTION OF THE DRAWINGS

FIG. 15 is a view for describing an operation of holding transmission of payment information during maintenance of a pressure input according to various embodiments of the present disclosure.

FIG. 16 is a view for describing an operation of restarting on-going transmission of payment information in case of detection of a pressure input according to various embodiments of the present disclosure.

FIGS. 23 and 24 are views for describing an operation of controlling a media player based on a pressure input during execution of a function of the media player according to various embodiments of the present disclosure.

DETAILED DESCRIPTION

Figure 1:
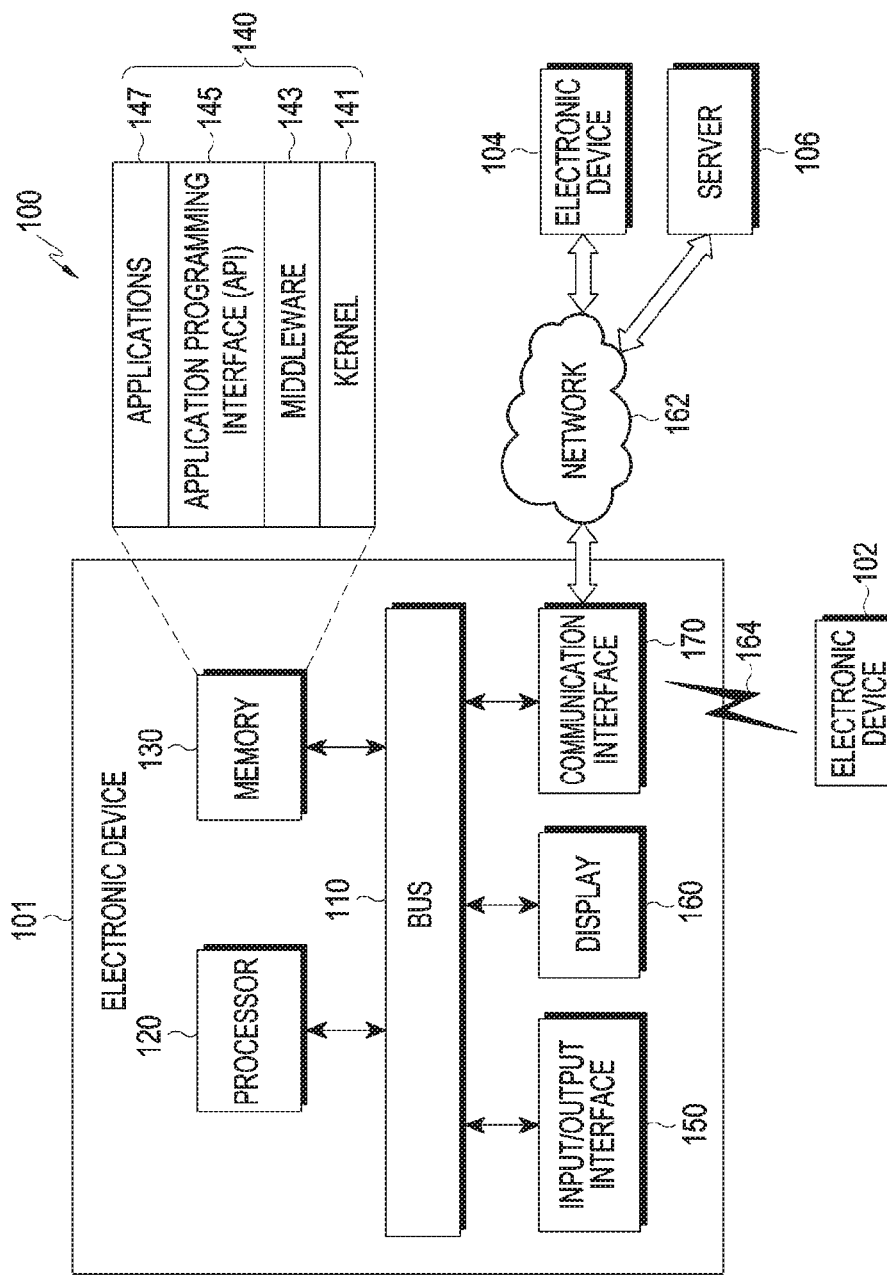
FIG. 1 illustrates a network environment including an electronic device according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

Examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, the electronic device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console, an electronic dictionary, an electronic key, a camcorder, and an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, a drone, an automatic teller's machine (ATM), a Point of Sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device.

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements. The bus 110 may include a circuit for connecting, e.g., the elements 110 to 2170 and delivering communication (e.g., a control message or data) between the elements 110 to 170. The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, etc.) to users. The display 160 may include a touch screen, and receives a touch, a gesture, proximity, or a hovering input, for example, by using an electronic pen or a part of a body of a user. The communication interface 170 establishes communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

Wireless communication may include a cellular communication protocol using at least one of, for example, long-term evolution (LTE), LTE advance (LTE-A), code division multiple access (CDMA), wideband CDMA (WCDMA), universal mobile telecommunications system (UMTS), wireless broadband (WiBro), global system for mobile communications (GSM), and so forth. According to an embodiment, the wireless communication may include at least one of Wireless Fidelity (WiFi), Bluetooth, Bluetooth Low Energy (BLE), Zigbee, near field communication (NFC), magnetic secure transmission (MST), radio frequency (RF), and a body area network (BAN). According to an embodiment, the wireless communication may include a global navigation satellite system (GNSS). The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of a universal serial bus (USB), a high definition multimedia interface (HDMI), a recommended standard 232 (RS-232), power line communication, a plain old telephone service (POTS), and so forth. The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

Figure 2:
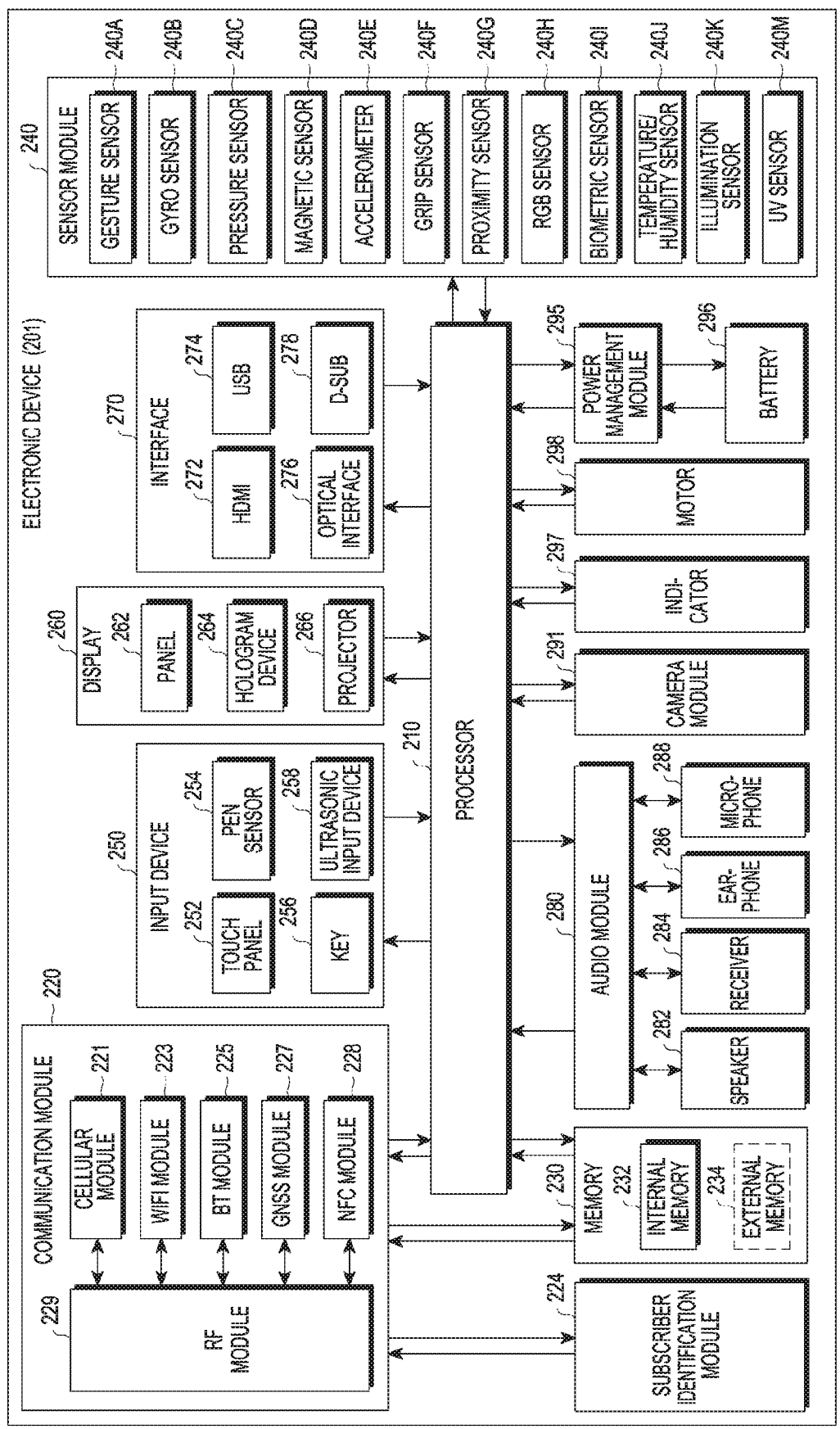
FIG. 2 is a block diagram of an electronic device according to various embodiments of the present disclosure.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an operating system (OS) or an application program, and performs processing and operations with respect to various data. The processor 210 may be implemented with, for example, a system on chip (SoC). According to an embodiment of the present disclosure, the server 210 may include a graphic processing unit (GPU) and/or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface 170. The communication module 220 may include, for example, the cellular module 221, a WiFi module 223, a Bluetooth (BT) module 225, a GNSS module 227, an NFC module 228, and a radio frequency (RF) module 229. The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 may perform at least one of functions that may be provided by the processor 210. According to an embodiment, the cellular module 221 may include a communication processor (CP). According to some embodiment, at least some (e.g., two or more) of the cellular module 221, the WiFi module 223, the BT module 225, the GNSS module 227, and the NFC module 228 may be included in one integrated chip (IC) or IC package. The RF module 229 may, for example, transmit and receive a communication signal (e.g., an RF signal). The RF module 229 may include a transceiver, a power amplifier module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module. The SIM 224 may, for example, include a card including a SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD). The external memory 23b may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., red/green/blue (RGB) sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module. According to an embodiment, the panel 262 may include a pressure sensor (or a "force sensor", interchangeably used hereinafter) capable of measuring a strength of a pressure by a user's touch. The pressure sensor may be implemented integrally with the touch panel 252 or may be implemented as one or more sensors separate from the touch panel 252. The hologram device 264 may show a stereoscopic image in the air by using interference of light. The projector 266 may display an image onto a screen through projection of light. The screen may be positioned inside or outside the electronic device 201. The interface 270 may include an HDMI 272, a USB 274, an optical interface 276, or a D-subminiature (D-sub) 278. The interface 270 may be included in the communication interface 170 illustrated in FIG. 1. Additionally or alternatively, the interface 270 may include a mobile high-definition link (MHL) interface, an SD/multi-media card (MMC) interface, or an Infrared Data Association (IrDA) interface.

The audio module 280 may bi-directionally convert sound and an electric signal. At least one element of the audio module 280 may be included in the input/output interface 145 illustrated in FIG. 1. The audio module 280 may process sound information input or output through the speaker 282, the receiver 284, the earphone 286, or the microphone 288. The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme may include a magnetic-resonance type, a magnetic induction type, and an electromagnetic type, and may further include an additional circuit for wireless charging, for example, a coil loop, a resonance circuit, or a rectifier. The battery gauge may measure the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 may convert an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments, some components of the electronic device (e.g., the electronic device 201) may be omitted or may further include other elements, and some of the components may be coupled to form one entity and identically perform functions of the components before being coupled.

Figure 3:
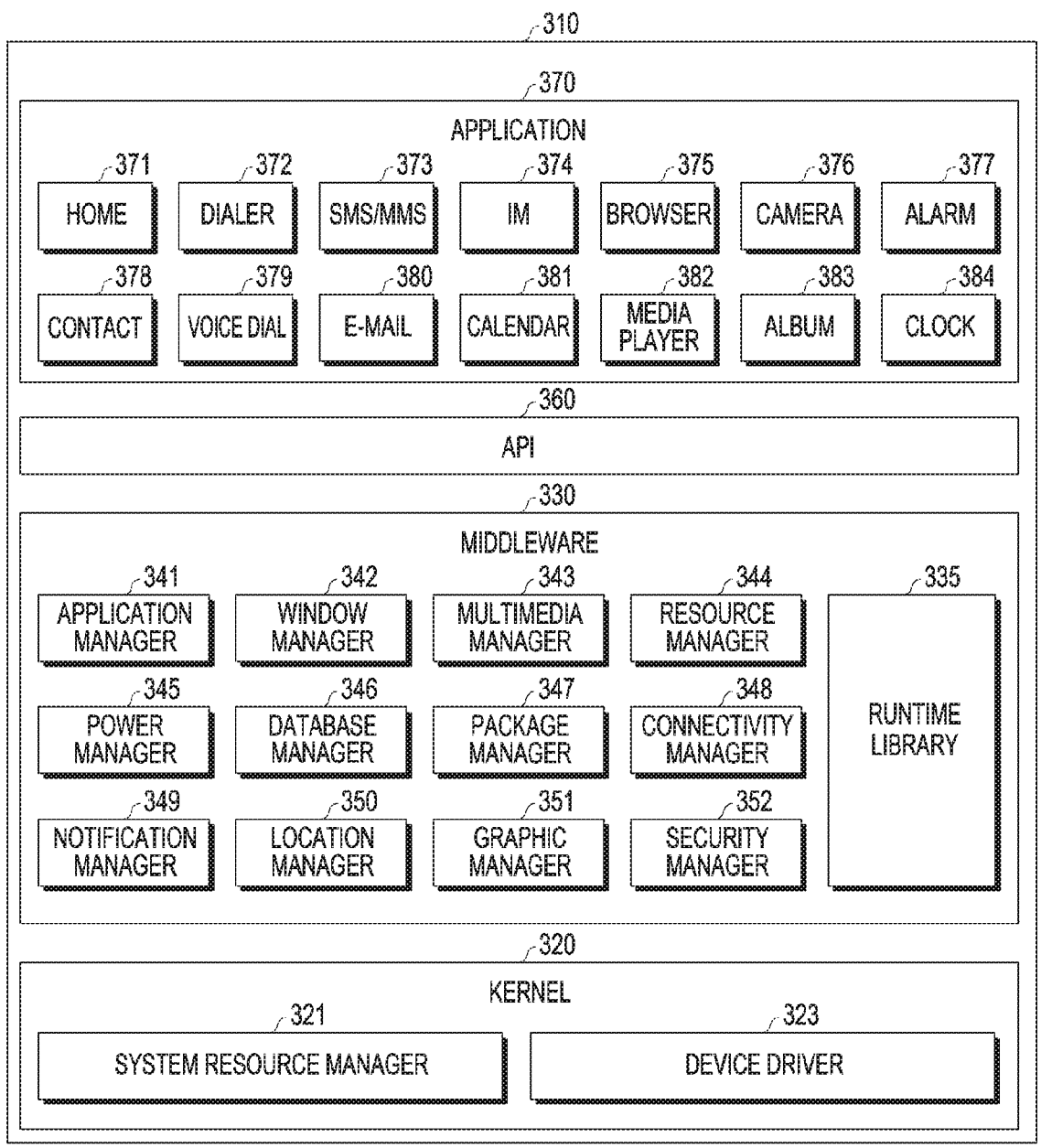
FIG. 3 is a block diagram of a programming module according to various embodiments of the present disclosure.

FIG. 3 is a block diagram of a programming module according to various embodiments. According to an embodiment, a programming module 310 (e.g., the program 140) may include an OS for controlling resources associated with an electronic device (e.g., the electronic device 101) and/or various applications (e.g., the application program 147) executed on the OS. The OS may include Android™, iOS™, Windows™ Symbian™, Tizen™, or Bada™. Referring to FIG. 3, the programming module 310 may include a kernel 320 (e.g., the kernel 141), middleware 330 (e.g., the middleware 143), an application programming interface (API) 360 (e.g., the API 145), and/or an application 370 (e.g., the application program 147). At least a part of the programming module 310 may be preloaded on an electronic device or may be downloaded from an external device (e.g., the electronic device 102 or 104, or the server 106).

The kernel 320 may include a system resource manager 321 and/or a device driver 323. The system resource manager 321 may perform control, allocation, retrieval of system resources, and so forth. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs input/output management, memory management, or calculation function processing. The application manager 341 manages a life cycle of the applications 370. The window manager 342 manages a graphic user interface (GUI) resource used in a screen. The multimedia manager 343 recognizes a format necessary for playing media files and performs encoding or decoding on a media file by using a codec appropriate for a corresponding format. The resource manager 344 manages a source code or a memory space of the applications 370. The power manager 345 manages a battery or power and provides power information necessary for an operation of the electronic device. According to an embodiment, the power manager 345 may operate with basic input/output system (BIOS). The database manager 346 generates, searches or changes a database used for at least one application among the applications 370. The package manager 347 manages the installation or update of an application distributed in a package file format.

The connectivity manager 348 manages a wireless connection. The notification manager 349 provides an event, e.g., an arriving message, an appointment, proximity notification, etc. The location manager 350 manages location information of an electronic device. The graphic manager 351 manages, for example, a graphic effect to be provided to a user or a user interface relating thereto. The security manager 352 provides, for example, system security or user authentication. According to an embodiment, the middleware 330 may further include a telephony manager for managing a voice or video call function of the electronic device or a middleware module forming a combination of functions of the above-described components. According to an embodiment, the middleware 330 provides a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

According to various embodiments, the present disclosure relates to an operation of an electronic device such that a user may perform a desired operation intuitively and fast by using a pressure input (also called a force touch). For example, the electronic device may quickly activate/deactivate a particular function for a currently executed service based on a pressure input. When using a function of an electronic device, which requires a repeated and temporary operation, the user may be provided with convenience.

Figure 4:
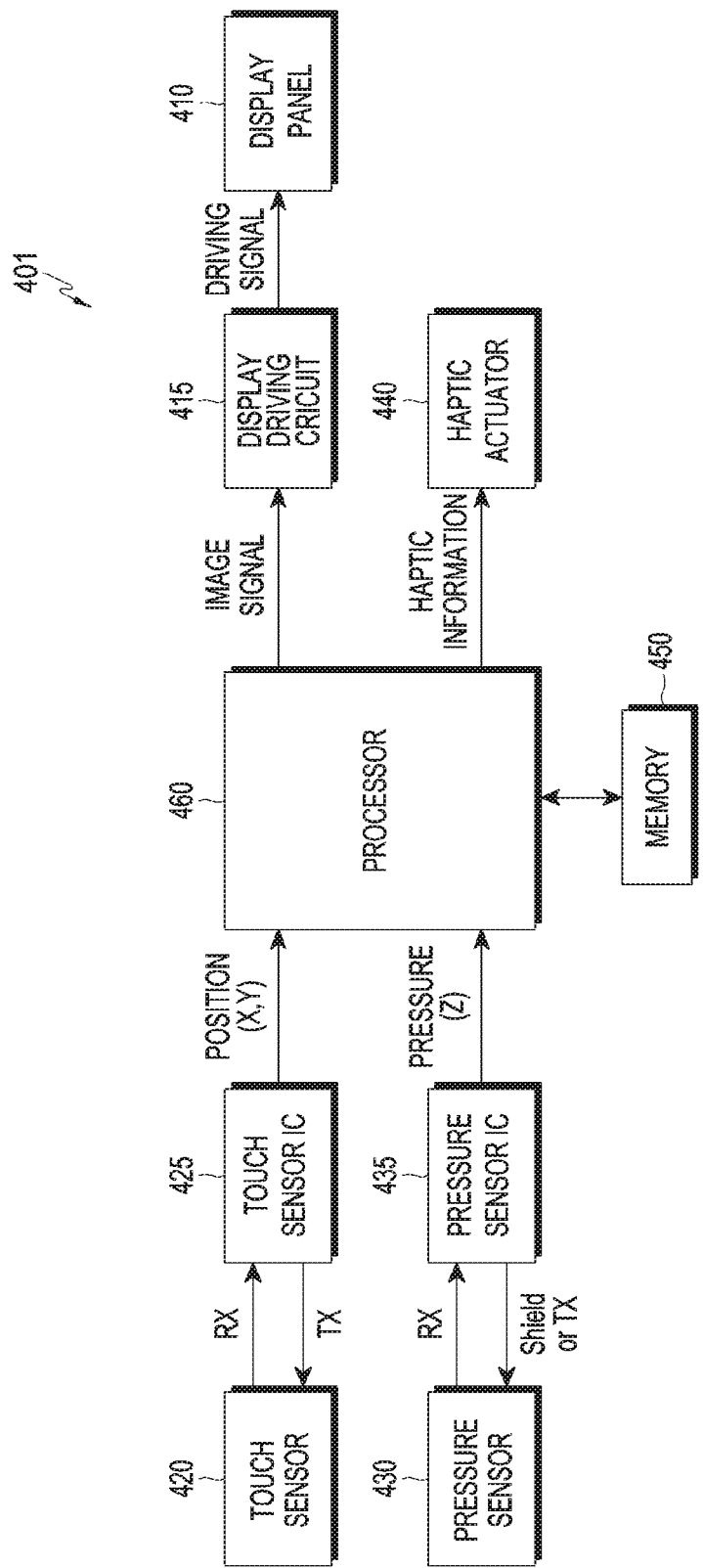
FIG. 4 is a block diagram showing a structure of an electronic device according to various embodiments of the present disclosure.

FIG. 4 is a block diagram showing a structure of an electronic device according to various embodiments of the present disclosure.

Referring to FIG. 4, an electronic device 401 according to an embodiment may include a display panel 410, a display driving integrated circuit (IC) (DDI) 415, a touch sensor 420, a touch sensor IC 425, a pressure sensor 430, a pressure sensor IC 435, a haptic actuator 440, a memory 450, and a processor 460. Components described above with reference to FIGS. 1 through 3 will not be described repeatedly.

The display panel 410 may receive an image driving signal supplied from the DDI 415. The touch panel 410 may display various contents and/or items (e.g., a text, an image (object), video, an icon, a function object, a symbol, etc.) based on the image driving signal. In this document, the display panel 410 may be overlappingly combined with the touch sensor 420 and/or the pressure sensor 430 (e.g., see FIGS. 5A and 5B), or may be referred to as simply a "display". The display 410 may be driven in a low-energy mode.

The DDI 415 may supply an image driving signal corresponding to image information received from the processor 460 (a host) to the display panel 410 at a set frame rate. The DDI 415 may drive the display panel 410 in the low-energy mode. Although not shown, according to an embodiment, the DDI 415 may include a graphic random access memory (RAM), an interface module, an image processing unit, a multiplexer, a display timing controller (T-con), a source driver, a gate driver, and/or an oscillator, etc.

In the touch sensor 420, a designated physical quantity (e.g., a voltage, a quantity of light, a resistance, a quantity of electric charge, a capacitance, etc.) may be changed due to a touch by the user. According to an embodiment, the touch sensor 420 may be arranged overlappingly with the display panel 410.

The touch sensor IC 425 may sense a change in the physical quantity (e.g., a voltage, a resistance, a capacitance, etc.) in the touch sensor 420 and calculate a position (X, Y) where the touch is made, based on the change of the physical quantity. The calculated position (coordinates) may be provided (or reported) to the processor 460.

For example, when a user's body part (e.g., a finger), an electronic pen, or the like contacts a cover glass (e.g., 510 of FIG. 5) of the display, a coupling voltage between a transmitting terminal Tx and/or a receiving terminal Rx included in the touch sensor 420 may change. The change in the coupling voltage may be sensed by the touch sensor IC 425 which may deliver the coordinates (X, Y) of the position where the touch is applied to the processor 460. The processor 460 may obtain data regarding the coordinates (X, Y) as an event regarding a user input.

The touch sensor IC 425 may include a touch IC, a touch screen IC, a touch controller, a touch screen controller IC, etc. According to an embodiment, in an electronic device not including the touch sensor IC 425, the processor 460 may execute a function of the touch sensor IC 425. According to an embodiment, the touch sensor IC 425 and the processor 460 may be implemented in a single component (e.g., one chip).

The pressure sensor 430 may sense a pressure (or a force) from an external object (e.g., a finger or an electronic pen). According to an embodiment, in the pressure sensor 430, a physical quantity (e.g., a capacitance) between the transmitting terminal Tx (e.g., a first electrode 541 of FIGS. 5A and 5B) and the receiving terminal Rx (e.g., a second electrode 542 of FIGS. 5A and 5B) may be changed by a touch.

The pressure sensor IC 435 may sense a change in the physical quantity (e.g., a capacitance, etc.) in the touch sensor 430 and calculate a pressure Z applied by a user's touch, based on the change of the physical quantity. The pressure sensor IC 435 may calculate a change (speed) of a strength of a pressure applied by a touch of the user, a direction in which the pressure is applied, a strength of the pressure, etc. The pressure sensor may identify a change (speed) of a pressure strength for a unit time, a direction in which the pressure is applied, a strength of the pressure, etc. The pressure Z, the strength, speed, and direction of the pressure, and so forth may be provided to the processor 460 together with the coordinates (X, Y) at which the touch is made.

According to an embodiment of the disclosure, the strength of the pressure may be a strength or level of the pressure. The strength of a particular section of the pressure may be set to a specific level, for example, to a level 1 L1 when the strength of the pressure ranges from 1 to 3.

According to an embodiment of the disclosure, the pressure sensor IC 435 may be mentioned as a force touch controller, a force sensor IC, a pressure panel IC, etc. According to various embodiments of the disclosure, the touch sensor IC 435 may be implemented in a single component (e.g., one chip) together with the touch sensor IC 425.

The haptic actuator 440 may provide tactile feedback (e.g., vibration) to the user in response to a control command of the processor 460. For example, the haptic actuator 440 may provide a tactile feedback to the user when receiving a touch input (e.g., a touch, a hovering, and a force touch) from the user.

In the memory 450, a command or data related to operations of components included in the electronic device 401 may be stored. For example, in the memory 450 may be stored at least one application program including a user interface configured to display a plurality of items on a display. For example, the memory 450 may store instructions that cause, when executed, the processor 460 to perform various operations described herein.

The processor 460 may be electrically connected with components 410 through 450 included in the electronic device 401 and perform computation or data processing for control and/or communication of the components 410 through 450 included in the electronic device 401.

According to an embodiment of the disclosure, the processor 460 may launch (or execute) an application program (or simply referred to as an "application") that displays a user interface on the display panel 410. The processor 460 may display an array of a plurality of items on the user interface displayed on the display panel 410 in response to launching of the application.

The processor 460 may receive first data (data including the position coordinates (X, Y) of the touch) generated from the touch sensor 420 and second data (data including the pressure Z of the touch) generated from the pressure sensor 430.

According to an embodiment of the disclosure, the processor 460 may activate at least a part of the pressure sensor 430 while the display panel 410 is deactivated. The processor 460 may at least partially activate the pressure sensor 430 while the display panel 410 is deactivated. For example, the processor 460 may activate the entire pressure sensor 430 or a part thereof in a standby state of the electronic device 401 where a component such as the display panel 410, etc., is deactivated as well as in an awake state of the electronic device 401. The processor 460 may at least partially deactivate the touch sensor 420 while the display panel 410 is deactivated or while the electronic device 401 is in the standby state. For example, when the touch sensor is partially deactivated, the electronic device may reduce power consumption in the standby state and thus reduce touch-caused malfunction.

According to an embodiment of the disclosure, the processor 460 may activate at least a part of the pressure sensor 430 when a designated condition is achieved in the deactivated state of the display panel 410. For example, the processor 460 may activate the pressure sensor 430 after or during a designated time from when the display panel 410 is deactivated. In another example, the processor 460 may activate the pressure sensor 430 upon sensing the use by the user by means of a gyro sensor, a proximity sensor, or the like. In another example, the processor 460 may activate the pressure sensor 430 when the temperature is lower than a designated value, a touch is sensed by the touch sensor 411, the electronic device 401 approaches another external device, or a stylus pen mounted in the electronic device 401 is pulled out from the electronic device 401. In another example, the processor 460 may activate the pressure sensor 430 during execution of an application (e.g., a music player) operating in the standby state.

According to an embodiment of the disclosure, the processor 460 may deactivate at least a part of the pressure sensor 430 when a designated condition is achieved during the turned-off state of the touch screen display 410. For example, the processor 460 may deactivate the pressure sensor 430 when sensing using a proximity sensor, an illumination sensor, an acceleration sensor, and/or a gyro sensor, etc., that the electronic device 401 is in the pocket or bag or is turned over. In another example, the processor 460 may deactivate the pressure sensor 430 when the electronic device 401 is connected with an external device (e.g., connected with a desk top).

According to an embodiment of the disclosure, the processor 460 may activate only a designated region of the pressure sensor 430 while the display panel 410 is deactivated. For example, the processor 460 may activate a designated partial region of the pressure sensor 430 (e.g., a central lower region of the pressure sensor 430) to reduce power consumption in the standby state. When the pressure sensor 430 is implemented with a set of two or more sensors, the processor 460 may activate some of the two or more sensors.

As such, the processor 460 may sense a pressure using the pressure sensor 430 during the standby state of the electronic device 401, by activating or enabling the pressure sensor 430. For example, the processor 460 may receive data regarding pressure applied by an external object to the display panel 410 from the pressure sensor 430 during the deactivated state of the display panel 410.

According to an embodiment of the disclosure, the processor 460 may identify whether a pressure is greater than or equal to a selected level based on the data regarding the pressure, and may perform a function without fully activating the display panel 410 when determining that the pressure is greater than or equal to the selected level. For example, the processor 460 may perform a function when sensing a higher level of pressure than a designated level. In this case, the processor 460 may activate a part of the display panel 410. The processor 460 may determine a function to be executed based on at least one of a position where the pressure is sensed, a strength of the sensed pressure, the number of points where the pressure is sensed, a speed of the sensed pressure, a direction of the sensed pressure, and a duration of the sensed pressure. For example, the processor 460 may wake up the electronic device 401 when sensing a pressure in a position corresponding to a central lower portion of the display panel 410. The processor 460 may control volume of a speaker of the electronic device 401 when sensing a pressure in a position corresponding to a left upper portion of the display panel 410. The processor 460 may perform a function related to adjacent hardware upon sensing a pressure in a position adjacent to hardware such as an earjack, a universal serial bus (USB) port, etc. The processor 460 may control the electronic device 401 to enter an emergency mode upon sensing the pressure of a higher strength than a designated strength. The processor 460 may perform a different function depending on the number of points where pressure is sensed at the same time.

Although it is illustrated in FIG. 4 that the pressure sensor 430 provides data regarding the pressure Z to the processor, the processor 460 may detect a position where the pressure is applied, based on a position of a sensor where a capacitance is changed among two or more sensors, when the pressure sensor 430 is implemented with a set of the two or more sensors, without being limited to the illustration. For example, when the pressure sensor 430 is implemented with a set of six sensors arranged in a 3×2 array, the processor 460 may determine a position where the pressure is applied, based on a change amount of capacitance of each sensor and a position where each sensor is arranged. That is, the processor 460 may determine a position where pressure is applied, without using the touch sensor 430. When sensing pressure using the pressure sensor 430, the processor 460 may activate the touch sensor 420 to sense the position where the pressure is applied using the activated touch sensor 420.

According to an embodiment of the disclosure, the processor 460 may perform a first function upon sensing, by the pressure sensor 430, a pressure of a first level applied by a touch. The processor 460 may determine the first function based on at least one of a position where the first-level pressure is sensed, a strength of the first-level pressure, the number of points where the first-level pressure is sensed, a speed of the first-level pressure, a direction of the first-level pressure, or a duration of the first-level pressure, and perform the determined first function. The first-level pressure may mean a pressure of a strength in a designated range.

The processor 460 may perform a second function associated with the first function, upon sensing, by the pressure sensor 430, a pressure of a second level applied by a touch during execution of the first function. The processor 460 may determine the second function based on at least one of a position where the second-level pressure is sensed, a strength of the second-level pressure, the number of points where the second-level pressure is sensed, a speed of the second-level pressure, a direction of the second-level pressure, or a duration of the second-level pressure. The second-level pressure may mean a pressure of a strength in a designated range. The strength of the second-level pressure may be higher or lower than that of the first-level pressure. The strength of the second-level pressure may be equal to that of the first-level pressure. The processor 460 may execute various functions based on a pressure that is a one-dimensional input by executing the second function associated with the first function under execution, when sensing the pressure during execution of the first function. After a touch on the electronic device, another function associated with a function under execution may be executed based on a magnitude of a pressure applied to the electronic device 401, thereby improving convenience in input manipulation.

The above-described operation of the processor 460 is merely an example, and is not limited to the foregoing disclosure. For example, an operation of a processor described in other parts of the present document may also be understood as an operation of the processor 460. In this document, at least some of operations described as operations of the "electronic device" may be understood as operations of the processor 460.

Figure 5A:
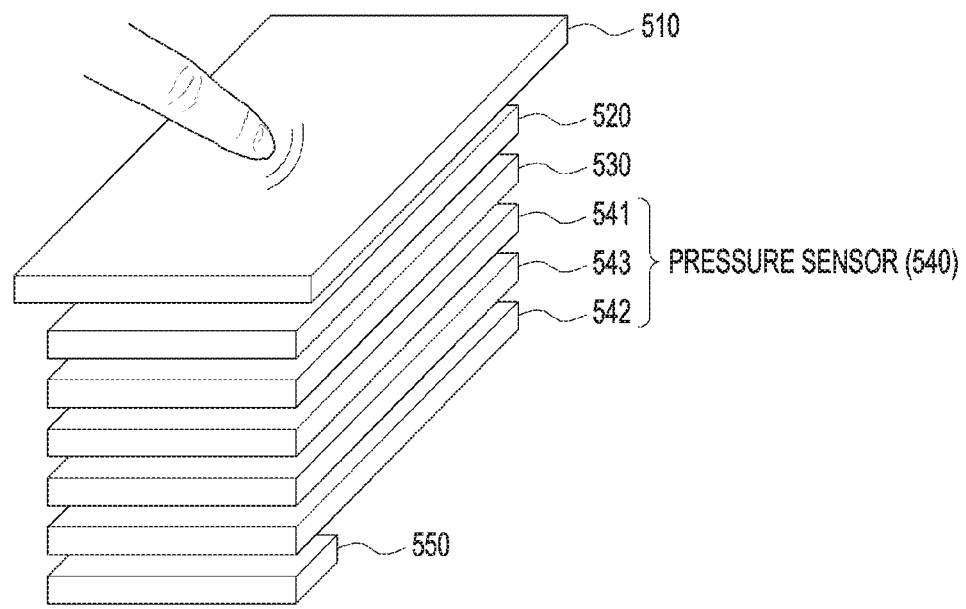
FIGS. 5A and 5B illustrate a structure in which components included in an electronic device are stacked, according to various embodiments of the present disclosure.
Figure 5B:
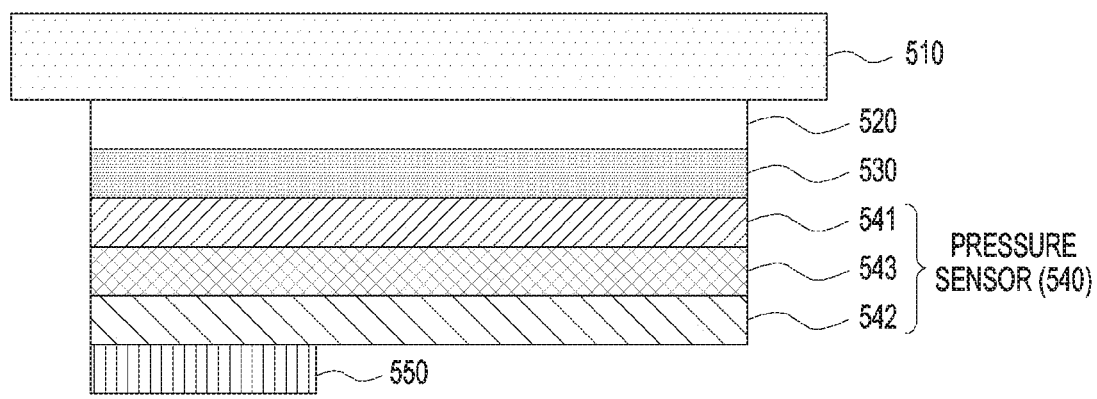

FIGS. 5A and 5B illustrate a structure in which components included in an electronic device are stacked, according to various embodiments of the present disclosure.

A stacked structure illustrated in FIGS. 5A and 5B may be applied to the display 110 illustrated in FIG. 1. Thus, components illustrated in FIGS. 5A and 5B may be arranged between a front surface (a first surface) and a rear surface (a second surface) of the electronic device 101 of FIG. 1.

In the stacked structure of the display according to an embodiment of the disclosure, the cover glass 510 may enable light generated by a display panel 530 to penetrate. A user may apply a "touch" (including a contact using an electronic pen) by contacting the cover glass 510 by a part of the body (e.g., a finger). The cover glass 510 may be formed of, for example, reinforced glass, reinforced plastic, a flexible high-polymer material, etc., to protect an electronic device having a display and a display mounted thereon from an external shock. According to an embodiment of the disclosure, the cover glass 510 may be mentioned as a glass window or a cover window.

In the touch sensor 520, various physical quantities (e.g., a voltage, an amount of light, a resistance, an amount of electric charge, a capacitance, etc.) caused by contact of an external object (e.g., a user's finger or an electronic pen) may change. The touch sensor 520 may sense at least one position of a touch input by the external object on a display (e.g., on the surface of the cover glass 510) based on a change of a physical quantity. For example, the touch sensor 520 may include a capacitive touch sensor, a pressure touch sensor, an infrared touch sensor, a resistive pressure sensor, a piezo touch sensor, etc. An electrode of the touch sensor 520 may be embedded in the display panel 530. According to an embodiment of the disclosure, the touch sensor 520 may be referred to as various names such as a touch panel, a touch screen panel, or the like, depending on an implementation type.

The display panel 530 may output at least one content or item (e.g., a text, an image, a video, an icon, a widget, a symbol, etc.). The display panel 530 may include, for example, an LCD panel, an LED display panel, an OLED display panel, an MEMS display panel, or an electronic paper display panel.

According to an embodiment of the present disclosure, the display panel 530 may be implemented in a single piece with the touch sensor (or a touch panel) 220. In this case, the display panel 530 may be referred to as a touch screen panel (TSP) or a touch screen display panel.

The pressure sensor 540 may sense a pressure (or force) applied from an external object (e.g., a finger or an electronic pen) to a display (e.g., the surface of the cover glass 510). According to an embodiment, the pressure sensor 540 may include a first electrode 541, a second electrode 542, and a dielectric layer 543. For example, the pressure sensor 540 may sense a pressure of a touch based on a capacitance changing with the pressure of the touch between the first electrode 541 and the second electrode 542.

The dielectric layer 543 of the pressure sensor 540 may include, for example, silicon, air, foam, a membrane, an optical clear adhesive (OCA), sponge, rubber, ink, or a polymer (polycarbonate (PC), polyethylene terephthalate (PET), etc.). An opaque material for the first electrode 541 and/or the second electrode 542 of the pressure sensor 540 may include at least one of Cu, Ag, Mg, Ti, or Graphene, and a transparent material therefor may include at least one of indium tin oxide (ITO), indium zinc oxide (IZO), Ag nanowire, metal mesh, a transparent high-polymer conductor, or graphene. One of the first electrode 541 and the second electrode 542 may be stave ground (GND), and the other may have a repeated polygonal pattern. For example, the pressure sensor may use a self-capacitance type. One of the first electrode 541 and the second electrode 542 may have a first direction pattern TX, and the other may have a second direction pattern RX that is perpendicular to the first direction. For example, the pressure sensor may be of a mutual capacitance type. The first electrode 541 of the pressure sensor may be formed on a flexible printed circuit board (FPCB) and may be adhered to the display panel 530 or may be directly formed on a surface of the display panel 530.

The pressure sensor 540 may be referred to as, for example, a force sensor. The pressure sensor 540 may use a current induction type, etc., as well as the above-described self-capacitance type and mutual capacitance type. Those of ordinary skill in the art may easily understand that there is no limitation in a type and an arranged position of the pressure sensor 540 as long as the pressure sensor 540 is capable of sensing a magnitude of a pressure applied to a part of the electronic device by a user when the user pressures the part of the electronic device.

Although it is illustrated in FIGS. 5A and 5B that the pressure sensor 540 is implemented with a single sensor, the pressure sensor 540 may be implemented with a set of two or more sensors, without being limited to the illustration. For example, the pressure sensor 540 may be implemented with a set of six sensors arranged in a 3×2 array.

A haptic actuator 550 may provide a haptic feedback (e.g., vibration) to the user when receiving a touch (including a hovering and/or a "force touch") input by an external object (e.g., a user's finger or an electronic pen, etc.). To this end, the haptic actuator 550 may include a piezoelectric member and/or a vibration plate, etc.

Referring to FIGS. 5A and 5B, the electronic device may include the cover glass 510 on top thereof, the touch sensor 520 under the cover glass 510, and the display panel 530 under the touch sensor 520. The electronic device may include the pressure sensor 540 including the first electrode 541, the dielectric layer 543, and the second electrode 542 under the display panel 530.

According to another embodiment of the disclosure, the electronic device may include the haptic actuator 550 under the pressure sensor 540.

The stacked structure of the display illustrated in FIGS. 5A and 5B described above is an example, and may be changed variously. For example, the touch sensor 520 may be formed directly on the rear surface of the cover glass 510 (a so-called 'cover glass-integrated touch panel'), may be separately manufactured and be inserted between the cover glass 510 and the display panel 530 (e.g., an add-on touch panel), may be formed directly on the display panel 530 (e.g., an on-cell touch panel), or may be included in the display panel 530 (e.g., an in-cell touch panel). According to various embodiments of the disclosure, the above-described stacked structure may further include a fingerprint sensor of an area type implemented opaque or transparent.

According to various embodiments of the disclosure, an electronic device (e.g., the electronic device 101) may include a housing including a first surface facing in a first direction and a second surface facing in a second direction that is opposite to the first direction, a touch screen display located between the first surface and the second surface and exposed through the first surface, a biometric sensor located between the first surface and the second surface and exposed through the housing, a pressure sensor located between the first surface and the second surface and configured to detect a pressure applied by an external object to the touch screen display, a wireless communication circuit configured to transmit and receive a short-range radio signal, at least one processor electrically connected to the touch screen display, the biometric sensor, the pressure sensor, and the wireless communication circuit, and a memory electrically connected to the processor, the memory storing at least one application program configured to execute payment by transmitting a first signal by using the wireless communication circuit, in which the memory stores one or more instructions that are configured to, when executed, cause the processor to execute the application program, to receive biometric data by using the biometric sensor after executing the application program, to transmit the first signal by using the wireless communication circuit during a selected period after receiving the biometric data, to detect the pressure applied to the touch screen display during the selected period by using the pressure sensor, and to perform at least one of pause, resumption, or restart of transmission of the first signal at least partially based on the detected pressure when a selected pressure level is detected by the pressure sensor during the selected period.

According to various embodiments of the disclosure, the biometric sensor may include a fingerprint sensor.

According to various embodiments of the disclosure, the selected pressure level may include a first level and a second level that is different from the first level, and the instructions may cause the processor to pause transmission of the first signal upon detecting a pressure greater than or equal to the first level, and to resume the transmission of the first signal whose the transmission is paused during a remaining period of the selected period upon detecting a pressure of a level less than the first level.

According to various embodiments of the disclosure, the instructions may cause the processor to restart transmission of the first signal during the selected period upon detecting a pressure of a level greater than or equal to the second level.

According to various embodiments of the disclosure, the instructions may cause the processor to pause transmission of the first signal upon detecting a pressure greater than or equal to the selected pressure level and to restart transmission of the first signal during the selected period upon detecting a pressure less than the first level.

According to various embodiments of the disclosure, the electronic device (e.g., the electronic device 101) may include a housing including a first surface facing in a first direction and a second surface facing in a second direction that is opposite to the first direction, a touch screen display located between the first surface and the second surface and exposed through the first surface, a pressure sensor configured to detect a pressure applied by an external object to the touch screen display, at least one processor electrically connected to the touch screen display and the pressure sensor, and a memory electrically connected to the processor, the memory storing at least one application program configured to execute at least one function regarding an image or a sound source, in which the memory stores one or more instructions that, when executed, cause the processor to execute the application program, and to detect the pressure applied to the touch screen display by using the pressure sensor after executing the application program, and to perform at least one of pause, resumption, or restart of transmission of the first signal at least partially based on the detected pressure when a selected pressure level is detected by the pressure sensor.

According to various embodiments of the disclosure, the instructions may cause the processor to resume or restart the function whose the execution is paused upon detecting release of the pressure during the pause of the execution of the function based on the detected pressure.

According to various embodiments of the disclosure, the function may include a function to receive streaming data of the image or the sound source or data of a browser.

According to various embodiments of the disclosure, the instructions may cause the processor to adjust a size of a buffer that stores the streaming data based on at least one of a duration of the pressure or a level of the pressure.

According to various embodiments of the disclosure, the instructions may cause the processor to receive the streaming data of an amount corresponding to a position of the pressure.

According to various embodiments of the disclosure, the instructions may cause the processor to mute the image or the sound source based on a level of the detected pressure.

According to various embodiments of the disclosure, the instructions may cause the processor to detect an additional pressure applied to the touch screen display and to pause or restart playback of the muted image or sound source based on a level of the detected additional pressure.

According to various embodiments of the disclosure, the electronic device (e.g., the electronic device 101) may include a housing including a first surface facing in a first direction and a second surface facing in a second direction that is opposite to the first direction, a touch screen display located between the first surface and the second surface and exposed through the first surface, a pressure sensor configured to detect a pressure applied by an external object to the touch screen display, at least one processor electrically connected to the touch screen display and the pressure sensor, and a memory electrically connected to the processor, the memory storing at least one application program configured to execute at least one function regarding an image or a sound source, in which the memory stores one or more instructions that are configured to, when executed, cause the processor to execute the application program, to perform at least one operation based on a user input after executing the application program, and to detect a pressure applied to the touch screen display by using the pressure sensor according to the user input and generate at least one bookmark for a play time of the image or sound source at least partially based on the detected pressure.

According to various embodiments of the disclosure, the instructions may cause the processor to generate at least one file regarding at least one section of the image or the sound source based on the detected pressure.

According to various embodiments of the disclosure, the instructions may cause the processor to generate at least one preview image regarding the section of the image based on the detected pressure.

According to various embodiments of the disclosure, the instructions may cause the processor to set at least one repeated play section regarding the image or the sound source based on the detected pressure.

According to various embodiments of the disclosure, the electronic device (e.g., the electronic device 101) may include a housing including a first surface facing in a first direction and a second surface facing in a second direction that is opposite to the first direction, a touch screen display located between the first surface and the second surface and exposed through the first surface, a pressure sensor configured to detect a pressure applied by an external object to the touch screen display, at least one processor electrically connected to the touch screen display and the pressure sensor, and a memory electrically connected to the processor and storing a first application program and a second application program that is selected to be displayed in response to the pressure applied by the external object, in which the memory stores one or more instructions that are configured to, when executed, cause the processor to display the first application program in at least a part of the touch screen display, to detect the pressure applied to the touch screen display by using the pressure sensor, and to display the second application program at least partially overlappingly with the first application program at least partially based on the detected pressure.

According to various embodiments of the disclosure, a different application program may be designated to be executed for each level of the detected pressure.

According to various embodiments of the disclosure, the instructions may cause the processor to terminate displaying of the second application program upon release of the detected pressure.

According to various embodiments of the disclosure, the instructions may cause the processor to detect an additional pressure applied to the touch screen display and to maintain displaying of an execution screen of the designated application program even in case of release of the detected pressure at least partially based on the detected additional pressure.

According to various embodiments of the disclosure, the instructions may cause the processor to detect an additional pressure applied to the touch screen display and to display the second application program in an entire region of the touch screen display at least partially based on the detected additional pressure.

Figure 6:
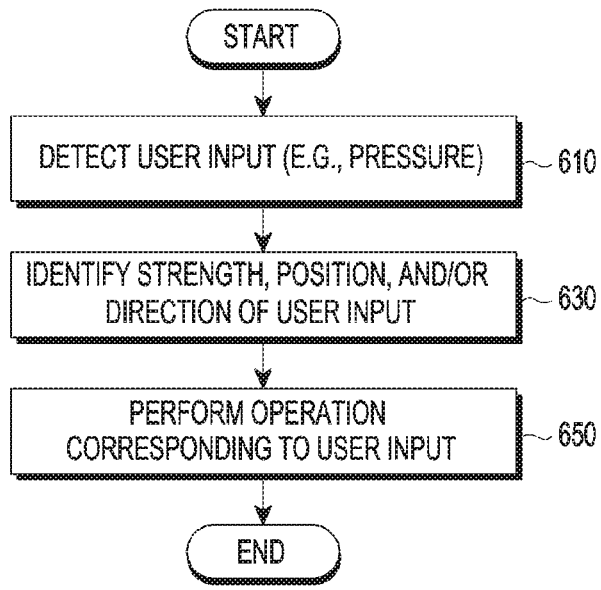
FIG. 6 is a flowchart of a method of controlling an electronic device according to various embodiments of the present disclosure.

FIG. 6 is a flowchart of a method of controlling an electronic device (e.g., the electronic device 101) according to various embodiments of the present disclosure.

Referring to FIG. 6, the electronic device may detect a user input (e.g., a pressure input) and perform an operation corresponding to the detected user input.

According to various embodiments of the disclosure, the electronic device may detect a user input, in operation 610. For example, the user input may be a pressure input in which pressure is input to the display by the user, when the user presses the display. The electronic device may detect the user input (e.g., a touch) using the touch sensor (e.g., 520) and detect a pressure of the user input using the pressure sensor (e.g., 540). In another example, the electronic device may detect the user input and the pressure of the user input by using the pressure sensor.

According to various embodiments of the disclosure, the electronic device may identify a strength, a position, and/or a direction of the user input, in operation 630. For example, when the electronic device senses the pressure of the user input by using one or more pressure sensors, the electronic device may identify a strength and/or a position of the pressure applied to the electronic device based on at least a part of information obtained using the one or more pressure sensors. In another example, the electronic device may identify a position of the pressure of the user input or the strength of the pressure based on at least a part of information obtained using the touch sensor or the pressure sensor.

According to various embodiments of the disclosure, the electronic device may identify a position of the user input and/or a strength of the pressure of the user input based on at least a part of the information obtained using the pressure sensor, and correct the identified position of the user input based on at least a part of the obtained information using the touch sensor and/or the information obtained using the pressure sensor. For example, the electronic device may obtain information regarding a user's touch by using the touch sensor, identify the position of the user input based on the obtained information, and identify a pressure strength of the user input sensed using the pressure sensor.

According to various embodiments of the disclosure, the electronic device may identify a direction of the user input (e.g., a direction of the pressure) applied to the electronic device by using one or more pressure sensors and/or touch sensors. For example, the direction of the pressure may be detected as the user moves a finger while applying the pressure input, or may include a change in a contact area of the pressure, a change in the position of the pressure, etc. In another example, the direction of the pressure may follow a direction of a force, changed as the user moves the finger while pressing the display by the finger.

According to various embodiments of the disclosure, the electronic device may perform an operation corresponding to the user input, in operation 650. For example, an operation corresponding to the user input may include pausing, resuming, or restarting transmission of data to an external electronic device. In another example, the operation may include pausing, resuming, or restarting execution of a function of an application being executed.

According to various embodiments of the disclosure, the electronic device may provide a feedback (e.g., a UX) corresponding to the pressure input to the user by using the strength and/or position of the pressure. The feedback may be an auditory, tactile, or visual feedback and include information regarding the operation. In another example, a set operation corresponding to the pressure input may be performed.

Figure 7:
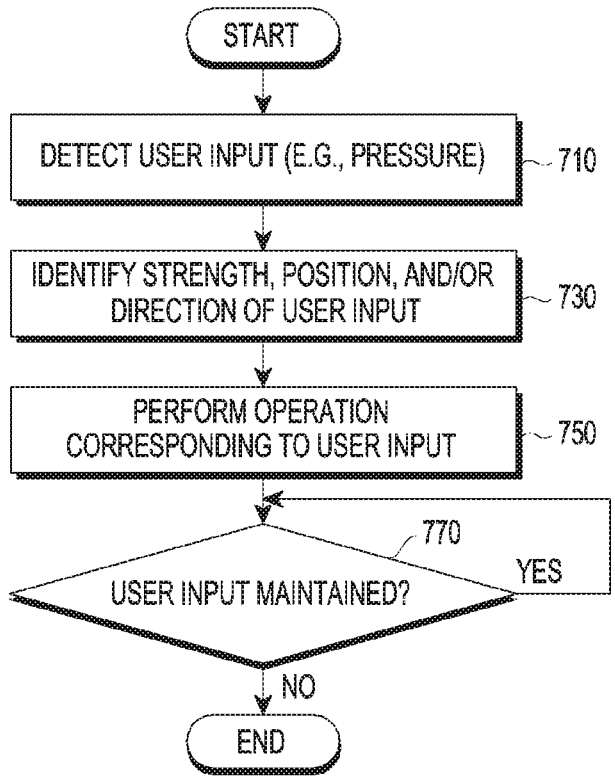
FIG. 7 is a flowchart of a method of controlling an electronic device according to various embodiments of the present disclosure.

FIG. 7 is a flowchart of a method of controlling an electronic device (e.g., the electronic device 101 of FIG. 1) according to various embodiments of the present disclosure.

Referring to FIG. 7, the electronic device may perform an operation corresponding to a user input (e.g., a pressure input) based on the user input and/or a duration of the input.

According to various embodiments of the disclosure, the electronic device may detect a user input, in operation 710.

According to various embodiments of the disclosure, the electronic device may identify a strength, a position, and/or a direction of the user input, in operation 730.

According to various embodiments of the disclosure, the electronic device may perform an operation corresponding to the user input, in operation 750. For example, the operation corresponding to the user input may include an operation for executing a designated application corresponding to a pressure level of the user input. In another example, during execution of an application for playing an image or a sound source back, the operation corresponding to the user input may include an operation for starting (or executing) generation of a bookmark for a play time of the image or the sound source to be played back, an operation for starting generation of a file for the image or the sound source to be played back, an operation for starting generation of a preview image of a section of the image, or an operation for setting a repeated play section of the image or sound source to be played back.

According to various embodiments of the disclosure, operations 710 through 750 are the same as operations 610 through 650 of FIG. 6 and thus will not be described in detail.

According to various embodiments of the disclosure, the electronic device may determine whether the user input is maintained, in operation 770. For example, the electronic device may continuously monitor whether the user input (e.g., the pressure input (the position and/or the strength of the pressure input) is continuously maintained.

According to various embodiments of the disclosure, in the case that the pressure input is maintained after the pressure input is made, execution of an operation corresponding to the pressure input may be maintained. For example, while the pressure input is maintained, the electronic device may maintain execution of an application executed corresponding to the pressure input. In another example, the electronic device may perform generation of a bookmark for a play time of the image or the sound source to be played back during maintenance of the pressure input, generation of a file for the image or the sound source to be played back during maintenance of the pressure input, generation of a preview image of a section of the image, setting of a repeated play section of the image or sound source to be played back during maintenance of the pressure input, or the like.

According to various embodiments of the disclosure, in the case that the pressure input is not maintained because the pressure input is released after the pressure input is made, execution of the operation corresponding to the pressure input may be terminated.

According to various embodiments of the disclosure, while the pressure input is maintained, the electronic device (e.g., the electronic device 101) may provide a feedback corresponding to the pressure input to the user at specific time intervals or in the unit of an operation changing every specific reference time. Thereafter, upon release of the pressure input, the electronic device may return to an operation state (e.g., a first operation state of a first function) previous to application of the pressure input. In other example, the electronic device may provide a feedback corresponding to the pressure input applied previously even in case of release of the pressure input. For example, by providing a feedback corresponding to a level and a position of the previously applied pressure input to the user, the user may recognize that the pressure input is released.

Figures 8, 9:
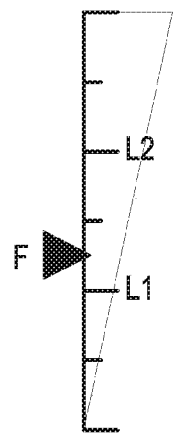
FIG. 8 illustrates a strength of a pressure input according to various embodiments of the present disclosure.
FIG. 9 illustrates a table showing a duration of an operation corresponding to a pressure strength according to various embodiments of the present disclosure.

FIG. 8 illustrates a strength of a pressure input according to various embodiments of the present disclosure.

Referring to FIG. 8, the electronic device (e.g., the electronic device 101) may the pressure input separately for at least one pressure level and perform a designated operation corresponding to each level. According to various embodiments of the disclosure, the pressure level (or stage) may be set based on a pressure strength. For example, L1 (a first threshold value) exceeding a specific threshold value greater than 0 may be designated as a first level (a first pressure level) or a value of a pressure strength from the specific threshold value greater than 0 to L1 may be designated as the first level, and a value of a pressure strength from L1 to L2 (a second threshold value) may be designated as a second level (a second pressure level). According to various embodiments of the disclosure, in the case that a pressure strength F of the received pressure input belongs to the first pressure level, the electronic device may perform an operation corresponding to the first pressure level. According to various embodiments of the disclosure, the electronic device may be configured such that a different application is executed for a different pressure level. For example, the electronic device may execute a designated first application corresponding to the first pressure level upon detection of the first pressure level, and may execute a designated second application corresponding to the second pressure level upon detection of the second pressure level.

FIG. 9 illustrates a table showing a duration of an operation corresponding to a pressure strength according to various embodiments of the present disclosure.

Referring to FIG. 9, an operation time (active time) of a function may be set (stored) based on a strength of a pressure input. According to various embodiments of the disclosure, an operation time corresponding to a particular function may be set for a designated pressure strength. For example, as illustrated in FIG. 9, the electronic device may be configured to execute a designated function for a first time (e.g., 5 seconds) in a pressure input of a first strength (a first force), for a second time (e.g., 10 seconds) in a pressure input of a second strength (a second force), and for a third time (e.g., 30 seconds) in a pressure input of a third strength (a third force). The first strength may be a pressure strength that is greater than or equal to L1 (the first threshold value), which exceeds the particular threshold value greater than 0, and less than L2 (the second threshold value). The second strength may be a pressure strength that is greater than or equal to L2 and less than L3 (a third threshold value). The third strength may be a pressure strength greater than or equal to L3.

According to various embodiments of the disclosure, during execution of a flash application, by setting an operation time of a flash operation based on a strength of a pressure input, an operation of a flash application may be controlled. For example, in the case that the pressure input is made, light may be generated by executing the flash function of the flash application, and the flash function may be executed during the first time for the first strength, during the second time for the second strength, and during the third time for the third strength.

According to various embodiments of the disclosure, by setting a time during which a screen of the electronic device is turned on, based on the strength of the pressure input, the time during which the screen of the electronic device is turned on may be controlled. For example, in the case that the pressure input is made, the screen of the electronic device may be turned on and the turned-on state of the screen of the electronic device may be maintained during the first time for the first strength of the pressure input, during the second time for the second strength of the pressure input, and during the third time for the third strength of the pressure input.

In addition to the above-described embodiments, an operation time of a particular function may be controlled based on a strength of a pressure input variously.

According to various embodiments of the disclosure, the electronic device (e.g., the electronic device 101) may perform a designated operation corresponding to a duration of the pressure input, though not shown. According to various embodiments of the disclosure, the duration of the pressure input may be processed separately for at least one time input level and a set operation corresponding to each level may be performed. For example, a duration of the pressure input, which is greater than or equal to the first time and less than the second time, may be set to and stored as a first time input level and a duration of the pressure input, which is greater than or equal to the second time, may be set to and stored as a second time input level. According to various embodiments of the disclosure, the duration of the pressure input may include a time during which pressure is actually applied to a particular position, and a time during which a touch is maintained at the position after detection of the initial pressure. In another example, the duration of the pressure input may include a time during which pressure is maintained in a pressure level range and/or a time during which pressure is maintained with a strength less than a designated strength after the initial pressure.

FIGS. 10 through 12 are views for describing execution of an application using a pressure input according to various embodiments of the present disclosure.

Referring to FIGS. 10 through 12, the electronic device (e.g., the electronic device 101) may set a designated application corresponding to a detected pressure input to be displayed at least a part of the screen, upon detection of the pressure input of the user during display or execution of at least one function. For example, the designated application may be an application designated to be immediately executed based on a user input or to be displayed on at least a part of the screen based on the user input in the case that the application is currently executed, but is not currently displayed. The designated application (e.g., the first application) may mean that the first application is set to be immediately executed or displayed merely with the user input rather than with an input with respect to the first application, thus avoiding the user's trouble of executing the first application through an input (e.g., a touch) with respect to the first application by moving the screen of the electronic device to a screen where the first application is located. According to various embodiments of the disclosure, upon detection of the pressure input to execute the first application on the screen of the electronic device during execution of any one application of the electronic device, the electronic device may immediately execute the first application. For example, the electronic device may display the first application at least partially overlappingly with the currently executed application based on at least a part of the detected pressure.

Referring to FIG. 10 according to various embodiments of the disclosure, the electronic device may execute and display an application, detect a user input during execution of the application, determine whether a designated application needs to be executed at least partially based on the detected user input, and execute or display an application designated to be immediately executed or displayed based on the detected user input in case of determining that an operation of the application designated to be immediately executed or displayed based on the user input is required. For example, the designated application may be displayed in at least a partial region of the screen of the currently executed application, and the designated application displayed in the at least a partial region of the screen may be displayed during maintenance of the user input. In another example, in the case that the user input is released, displaying of the designated application in the at least a partial region of the screen may be paused.

Figure 10E:
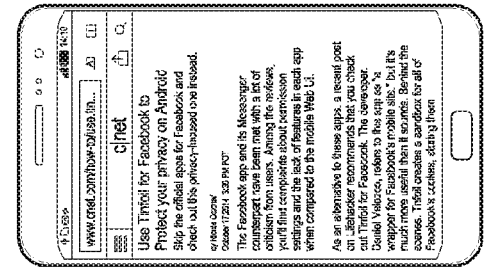
FIGS. 10 through 12 are views for describing execution of an application using a pressure input according to various embodiments of the present disclosure.
Figures 10C, 10D:
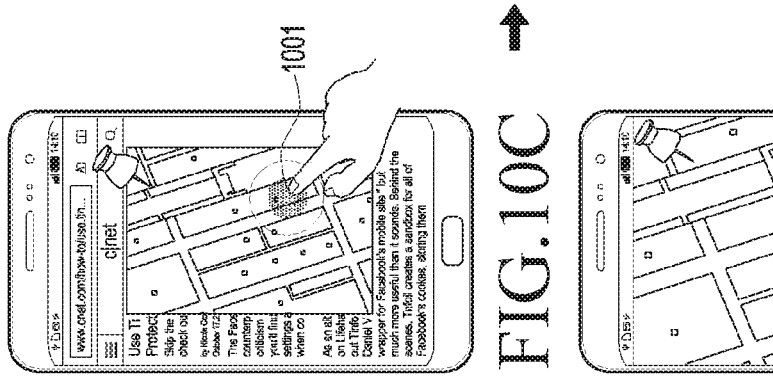
Figure 10B:
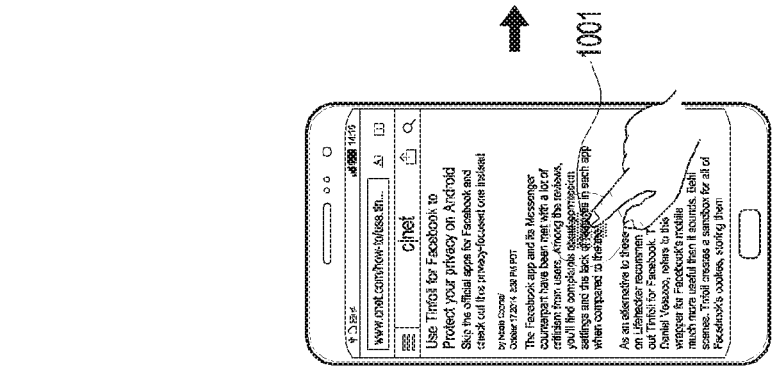
Figure 10A:
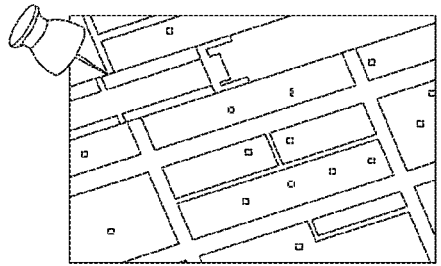

According to various embodiments of the disclosure, the electronic device (e.g., the electronic device 101) may designate a map application as illustrated in FIG. 10a as an immediately executable application. In this state, the electronic device may detect a pressure input 1001 of the user during execution of another application (or service) as illustrated in FIG. 10b.

According to various embodiments of the disclosure, the electronic device may display an application designated to be executed immediately in at least a partial region of the screen based on a detected pressure input in the case that the user's pressure input is detected. For example, the electronic device may display the map application designated to be executed immediately based on the detected user input to a designated size overlappingly with the other application as illustrated in FIG. 10c, or may execute an execution screen of the map application to a full size as illustrated in FIG. 10d.

According to various embodiments of the disclosure, the screen of the application displayed for a duration of the detected pressure input may be maintained. For example, for the duration of the pressure input 1001 as illustrated in FIG. 10c or FIG. 10d after execution of the map application, the electronic device may continue executing the map application, and upon release of the pressure input 1001, the electronic device may resume or restart execution of the other application executed prior to application of the pressure input 1001, as illustrated in FIG. 10e.

Referring to FIG. 11 according to various embodiments of the disclosure, in the electronic device (e.g., the electronic device 101), a plurality of applications may be designated as applications that are immediately executable based on a user input. According to various embodiments of the disclosure, a plurality of applications may be designated as applications that are immediately executable based on a user input, a pressure strength may be designated for each application to execute any one application corresponding to a pressure strength among the plurality of applications based on a pressure strength of the user input, and the electronic device may execute a designated application based on a strength of a detected pressure input. For example, the electronic device may execute a first application upon detecting a user's pressure input having a first strength, a second application upon detecting a user's pressure input having a second strength, and a third application upon detecting a user's pressure input having a third strength, and may terminate execution of an application executed based on a pressure input upon release of the pressure input. In another example, upon release of the pressure input, the electronic device may resume or restart execution of an application executed prior to execution of the application based on the pressure input.

Figure 11F:
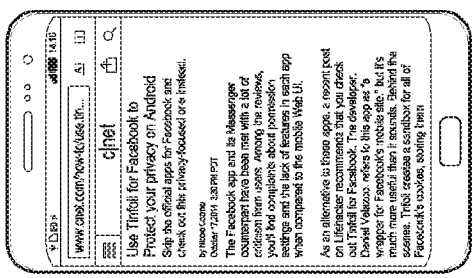
Figure 11D:
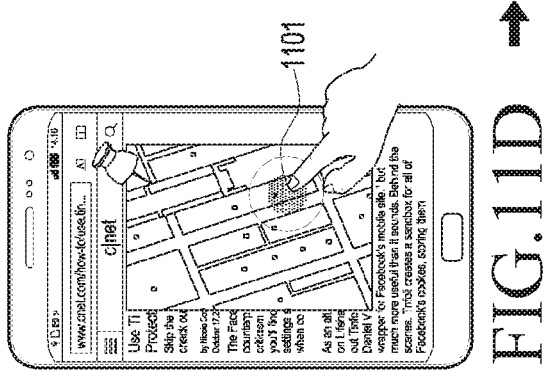
Figure 11E:
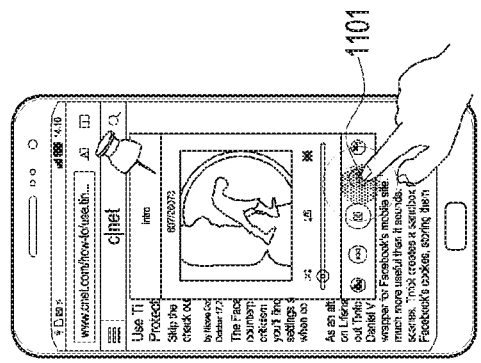
Figure 11C:
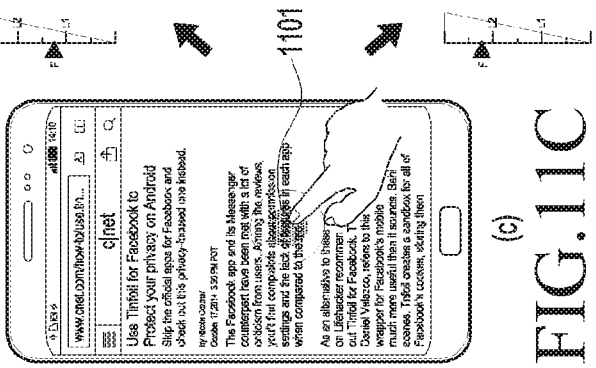
Figure 11B:
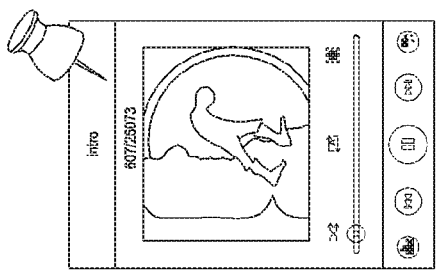
Figure 11A:
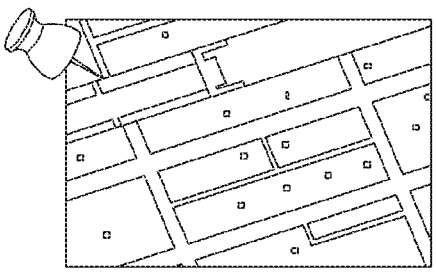

According to various embodiments of the disclosure, the electronic device (e.g., the electronic device 101) may designate a map application as illustrated in FIG. 11a as an immediately executable application corresponding to a first-strength pressure and a media player application as illustrated in FIG. 11b as an immediately executable application corresponding to a second-strength pressure. In this state, the electronic device may detect a user's pressure input 1101 of the first strength or the second strength during execution of an application (or service) as illustrated in FIG. 11c.

According to various embodiments of the disclosure, the electronic device may display an application designated to be executed immediately in at least a partial region of the screen based on a pressure of a detected pressure input in the case that the user's pressure input is detected. For example, in the case that a strength of a detected pressure is a first strength, as illustrated in FIG. 11d, the electronic device may execute the map application designated as being executed corresponding to a pressure input of the first strength and display the map application in at least a partial region of the screen. Although the map application is displayed in the at least a partial region of the screen in FIG. 11d, the map application may also be displayed in the entire region of the screen in another example. In another example, the electronic device may display an execution screen of a media player application, which is designated as being immediately executed corresponding to a detected pressure input of a second strength, to a designated size in at least a partial region of the screen, as illustrated in FIG. 11e. During maintenance of the pressure input 1101 after execution of the map application or the media player application, the electronic device may continue executing the map application or the media player application, and upon release of the pressure input 1101, the electronic device may resume or restart execution of another application executed prior to application of the pressure input 1101, as illustrated in FIG. 11f.

Referring to FIG. 12 according to various embodiments of the disclosure, the electronic device (e.g., the electronic device 101) may execute or display a designated application that is immediately executable based on a user input, and fix execution or displaying of the designated application upon detecting an additional input for fixing execution or displaying of the designated application. For example, fixing of execution or displaying of the designated application may include continuing executing the designated application without terminating execution of the designated application even in case of release of the user input for executing or displaying the designated application.

Figures 12A, 12B, 12C:
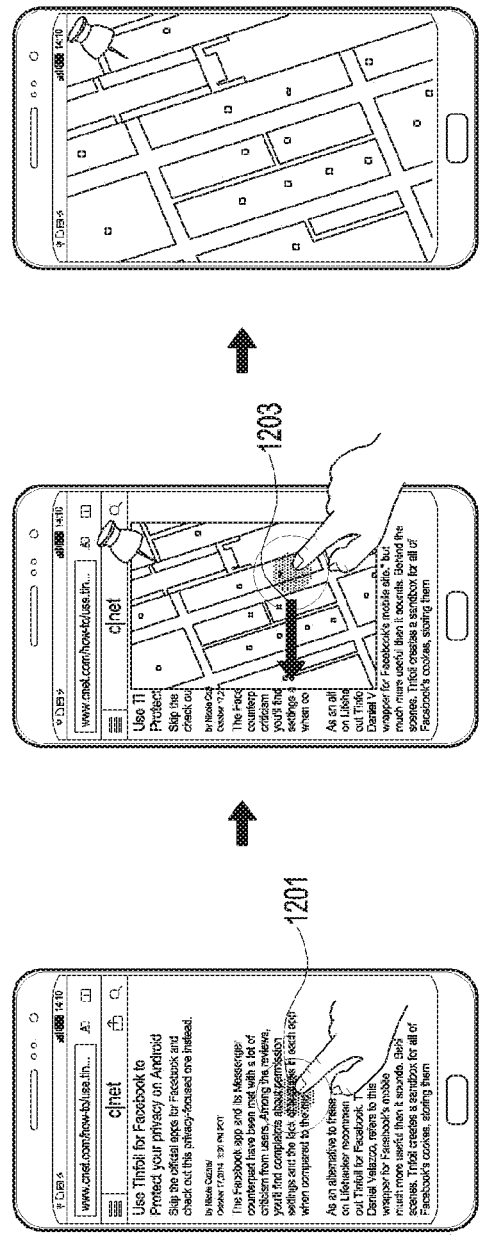

According to various embodiments of the disclosure, upon detecting a user's pressure input 1201 during execution of a particular application (or service) as illustrated in FIG. 12a, an electronic device (e.g., the electronic device 101) may display an execution screen of a map application that is immediately executable corresponding to the pressure input 1201 to a designated size as illustrated in FIG. 12b.

According to various embodiments of the disclosure, upon detecting an additional input 1203 continuously from the pressure input 1201 without release of the pressure input 1201 on the execution screen of the map application as illustrated in FIG. 12b, the electronic device may fix the map application to allow the user to continuously use the map application or may display the execution screen of the map application to the full size as illustrated in FIG. 12c.

According to various embodiments of the disclosure, the additional input 1203 may include a direction of the pressure (also called movement or a shear force) or a swipe gesture. For example, the direction of the pressure may be detected as the user moves a finger while inputting the pressure. In another example, the direction of the pressure may be detected from a change in a contact area of the user input or a change in a position of the user input. For example, the swipe gesture may be a gesture to move a finger by a specific distance in a particular direction such as a horizontal or vertical direction while touching by the finger on a display screen.

According to various embodiments of the disclosure, in the case that execution of the application is fixed or the application is executed to the full size as illustrated in FIG. 12c, the user may continue using the application even after release of the user's pressure input. Thereafter, although not shown, the application may be controlled by reception of a user's general touch input, and execution of a previous application that is executed prior to execution of the application corresponding to the pressure input may be resumed or restarted by another pressure input and/or an additional input (e.g., a swipe gesture).

According to various embodiments of the disclosure, although not shown, when the pressure input is received and the designated application executable immediately corresponding to the user input is executed, the electronic device (e.g., the electronic device 101) may provide a proper feedback. The feedback may be provided in an auditory, tactile, or visual manner. For example, upon execution of the designated application executable immediately corresponding to the user input, a visual effect as if the previous application is drawn into a position of the user's pressure input may be provided. Upon release of the pressure input, a visual effect as if the screen of the previous application is expanded from the position of the released pressure input may be provided. According to various embodiments of the disclosure, the electronic device may generate and provide a vibration feedback upon reception of the pressure input. For example, a different vibration feedback may be generated based on a pressure applied to the electronic device, or vibration of a designated strength may be provided based on a pressure strength of the pressure input.

According to various embodiments of the disclosure, although not shown, an electronic device (e.g., the electronic device 101) may temporarily switch to the previous application at once through the user's pressure input and/or an operation of maintaining the pressure input. For example, the electronic device may temporarily switch to the previous application merely with the pressure input during maintenance of the pressure, without setting of the designated application immediately executable corresponding to the user input. By using this function, information in another application may be referred to quickly and conveniently without a complex application switching operation.

Figure 13:
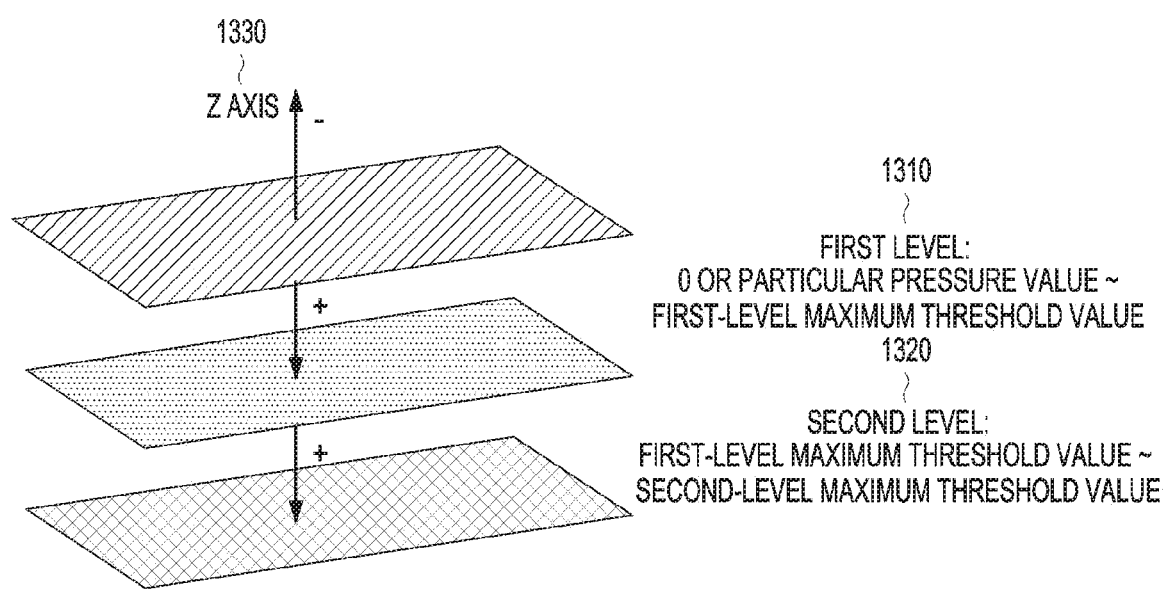
FIG. 13 illustrates a level against a pressure strength of a pressure input according to various embodiments of the present disclosure.

FIG. 13 illustrates a level against a pressure strength of a pressure input according to various embodiments of the present disclosure.

Referring to FIG. 13, the pressure input may be extended to an axis Z illustrated in FIG. 13. For example, the extension to the axis Z may mean execution of a hovering input in a designated recognition range in a minus (−) direction of the axis Z or the pressure input of an increased pressure strength in a designated recognition range in a plus (+) direction of the axis Z.

According to various embodiments of the disclosure, the pressure strength in the + direction may increase in proportion to a value recognized through a sensor capable of recognizing a strength of a force like a pressure sensor. The recognized value may be defined by reprocessing, and may be used separately for at least a first level 1310, a second level 1320, or more recognition levels. For example, when recognizing a pressure of the first level 1310 between 0 or a particular threshold value and a first-level maximum threshold value that is greater than 0 or the particular threshold value, the electronic device may recognize that the user intends to perform a particular operation corresponding to the first level 1310; when recognizing a pressure of the second level 1320 between the first-level maximum threshold value and a second-level maximum threshold value that is greater than the first-level maximum threshold value, the electronic device may recognize that the user intends to perform a particular operation corresponding to the second level 1320.

According to various embodiments of the disclosure, when executing an immediately executable application using a user's pressure input and/or an operation of maintaining the pressure input, the electronic device (e.g., the electronic device 101) may maintain the immediately executable application in a designated recognition range even in the case that the pressure input is extended to the axis Z 1330 illustrated in FIG. 13. For example, in the case that the pressure input is extended to the + direction or the − direction of the axis Z 1330, the electronic device may maintain the immediately executable application in a designated recognition range. When the pressure input is extended to the axis Z 1330 illustrated in FIG. 13, it may be applied to various embodiments as well as an embodiment where the immediately executable application is maintained.

According to various embodiments of the disclosure, to prevent malfunction between the user's touch input and the user's pressure input, start of the first level threshold value may be a particular non-zero value that is greater than 0.

Figure 14:
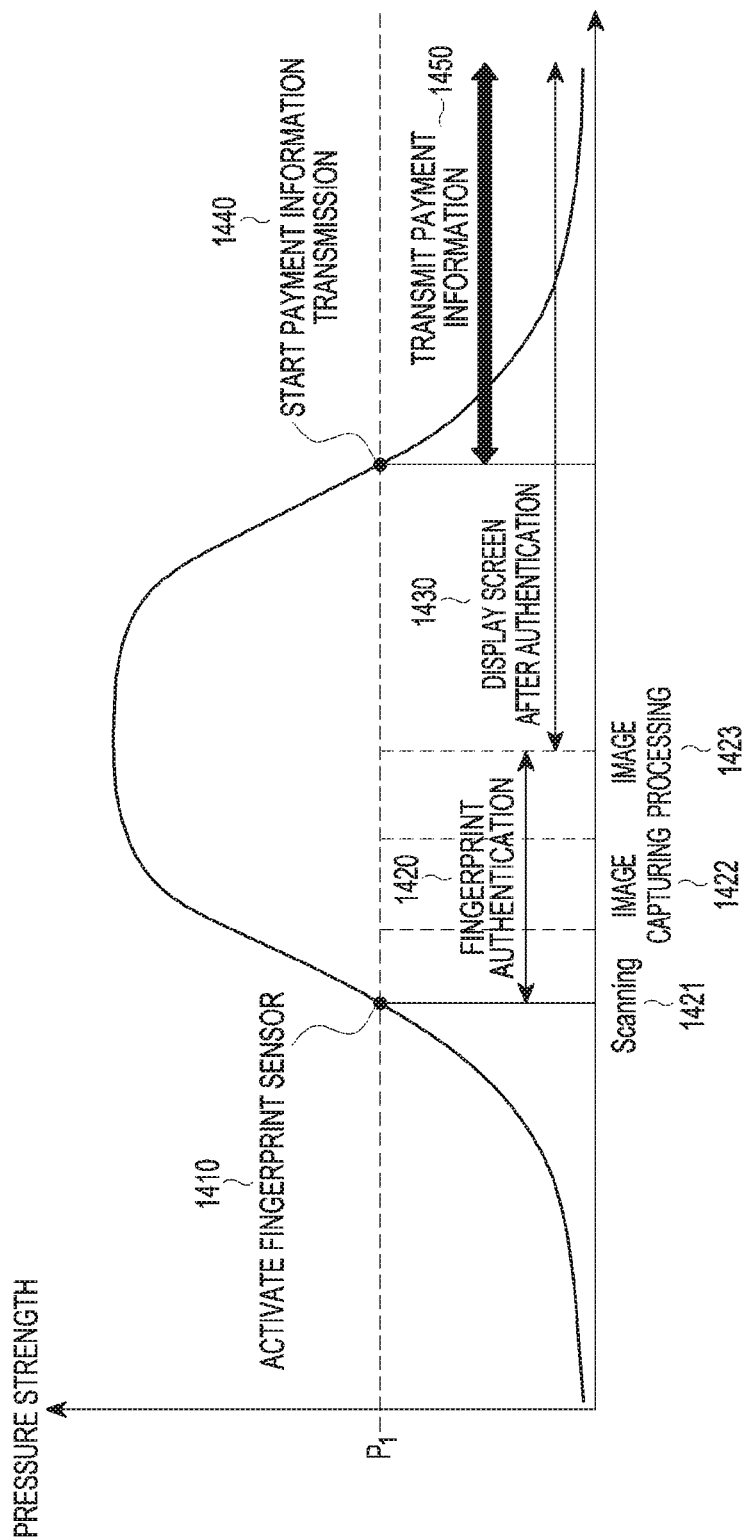
FIG. 14 is a graph for describing control of a payment service using a pressure input according to various embodiments of the present disclosure.

FIG. 14 is a graph for describing control of a payment service using a pressure input according to various embodiments of the present disclosure.

FIG. 15 is a view for describing an operation of holding transmission of payment information during duration of a pressure input according to various embodiments of the present disclosure.

Referring to FIGS. 14 and 15, in the case that the user applies and maintains a pressure input, the electronic device (e.g., the electronic device 101) may hold (or pause) execution of a particular operation during execution of the particular operation to temporarily stop the execution of the particular operation. The particular operation may include, for example, transmitting payment information during execution of a payment service application.

According to various embodiments of the disclosure, the electronic device (e.g., the electronic device 101) may control a function of a payment service based on fingerprint recognition, by using a pressure input and/or a duration of the pressure input. For example, upon detection of the user's pressure input after execution of the payment service application, the electronic device may receive fingerprint recognition data using a biometric sensor (e.g., a fingerprint sensor), hold transmission of payment information to an external electronic device during maintenance of the pressure input, and resume or restart transmission of the payment information upon release of the pressure input.

According to various embodiments of the disclosure, the electronic device (e.g., the electronic device 101) may activate a fingerprint sensor in operation 1410 upon detecting a pressure input 1501 of a strength greater than or equal to a first strength P1 as illustrated in FIG. 15a after executing a payment service application.

According to various embodiments of the disclosure, the electronic device may activate a fingerprint sensor in the case that a user's pressure input is detected on a display of a display device having embedded therein the fingerprint sensor in at least a portion thereof. In another example, although not shown, the fingerprint sensor may be embedded under a home button of the electronic device, and at least one pressure sensor may be arranged around the home button such that when the user pressures the home button, the pressure input is detected and the fingerprint sensor is activated.

According to various embodiments of the disclosure, the pressure input for activating the fingerprint sensor may be a pressure input of a strength greater than or equal to a designated strength. According to various embodiments of the disclosure, a region to activate the fingerprint sensor may be a portion around a region where the pressure input is detected.

According to various embodiments of the disclosure, in operation 1420, the electronic device may perform fingerprint authentication based on information regarding the fingerprint obtained by the activated fingerprint sensor. For example, fingerprint authentication of operation 1420 may include scanning of operation 1421, image capturing of operation 1422, and image processing of operation 1423.

Although it is illustrated in FIG. 14 that scanning of operation 1421, image capturing of operation 1422, and image processing of operation 1423 are sequentially performed, scanning of operation 1421, image capturing of operation 1422, and image processing of operation 1423 may be performed in various orders according to another embodiment of the disclosure.

According to various embodiments of the disclosure, once user's fingerprint authentication succeeds in fingerprint authentication of operation 1420, the electronic device may display a screen after preset authentication in operation 1430 as illustrated in FIG. 15*b*. Referring to FIG. 15*b*, the user may continuously maintain the user input 1501 during authentication after activation of the fingerprint sensor and screen display after authentication, and maintenance of the pressure input 1501 may hold transmission of a signal including payment information of a payment service. As the user directly adjusts a timing to activate transmission of payment information including a near field communication (NFC) signal or a magnetic secure transmission (MST) signal through a pressure input, unnecessary power consumption of the electronic device may be reduced.

According to various embodiments of the disclosure, upon release of the pressure input, the electronic device may start transmission of the payment information in operation 1440 such that the payment information is transmitted in operation 1450. For example, when a signal of a pressure input is not received or a signal of a pressure input of a strength less than or equal to a designated pressure strength is received upon release of the pressure input, the electronic device may transmit a signal including payment information of the payment service. When transmitting the signal including the payment information, a preset visual effect 1503 showing a transmission progress rate of the payment information may be displayed on the screen as illustrated in FIG. 15*c*.

FIG. 16 is a view for describing an operation of restarting on-going transmission of payment information in case of detection of a pressure input according to various embodiments of the present disclosure.

Referring to FIG. 16, upon detecting a pressure input during transmission of payment information after executing a payment service application, the electronic device (e.g., the electronic device 101) may restart, hold, or pause the transmission of the payment information to start again the transmission from the beginning.

According to various embodiments of the disclosure, upon detecting a pressure input 1601 as illustrated in FIG. 16*b* in a state where an execution screen of the payment service application is displayed as illustrated in FIG. 16*a*, the electronic device (e.g., the electronic device 101) may perform fingerprint authentication by activating a fingerprint sensor. In case of a success in fingerprint authentication, the electronic device may transmit a signal including the payment information and display information 1603 and 1607 regarding transmission of the payment information, as illustrated in FIGS. 16*b* through 16*d*. For example, the electronic device may display at least one of a time to transmit the payment information or a transmission progress rate of the payment information, based on the transmission of the payment information. In another example, the electronic device may display preset visual effects 1603 and 1607 corresponding to the transmission of the payment information.

According to various embodiments of the disclosure, during the transmission of the payment information, upon detecting a pressure input 1605, the electronic device may restart the transmission of the payment information from the beginning. For example, upon detecting the pressure input 1605 of a first strength during the transmission of the payment information, the electronic device may pause and restart the transmission of the payment information. The restart of the transmission of the payment information may mean transmitting the payment information from the beginning.

According to various embodiments of the disclosure, upon detecting the pressure input 1605 of the first strength during the transmission of the payment information, the electronic device may pause the transmission of the payment information, perform fingerprint authentication through activation of the fingerprint sensor again, and perform transmission of a signal including payment information again in case of a success in fingerprint authentication.

According to various embodiments of the disclosure, the electronic device may differentiate a time to restart transmission of payment information based on a strength of the pressure input 1605. For example, the electronic device may start transmission of payment information from a first time upon detecting the pressure input 1605 of the first strength, and although not shown, may restart the transmission of the payment information from the beginning upon detecting a pressure input of the second strength.

According to various embodiments of the disclosure, upon detecting the pressure input 1605 during transmission of the payment information, the electronic device may pause the transmission of the payment information during maintenance of the pressure input 1605 as illustrated in FIG. 16*c*, and then upon release of the pressure input 1605, the electronic device may transmit the payment information again.

According to various embodiments of the disclosure, the electronic device may differentiate a time to hold the transmission of the payment information based on the strength of the pressure input 1605. For example, the electronic device may hold the transmission of the payment information during the first time upon detecting the pressure input 1605 of the first strength, and although not shown, may hold the transmission of the payment information during a second time upon detecting a pressure input of the second strength.

According to various embodiments of the disclosure, although not shown, to control the payment service, the electronic device (e.g., the electronic device 101) may use other security means such as a pin, iris recognition, etc., as well as fingerprint recognition.

According to various embodiments of the disclosure, the electronic device (e.g., the electronic device 101) may include at least one pressure sensor in at least a partial region thereof. For example, a pressure sensor (or a grip sensor) may be arranged in at least a portion of a side of the electronic device, and the pressure sensor may be arranged in at least a portion between a first surface facing in a first direction and a second surface facing in a second direction opposing the first direction and may be arranged in at least a portion around the fingerprint sensor. Thus, the payment service may be controlled by a combination of a side pressure, a pressure in a screen region, and/or a pressure around a fingerprint sensor. In another example, the electronic device may pause transmission of payment information upon detecting a grip pressure through a grip sensor and/or a pressure sensor, and may restart the transmission of the payment information in the case that the grip pressure has a strength greater than or equal to a specific strength.

According to various embodiments of the disclosure, the electronic device may pause transmission of payment information upon detecting a pressure in a screen region and may restart the transmission of the payment information upon detecting a grip pressure.

According to various embodiments of the disclosure, the electronic device may designate a time to start (or pause)

transmission of payment information based on attributes, such as a speed, a strength, etc., of a pressure input. For example, the transmission may be held during 10 seconds for a pressure input of the first strength and during 20 seconds for a pressure input of the second strength.

According to various embodiments of the disclosure, the electronic device may restart the transmission of the payment information through various inputs in the case that the transmission of the payment information is paused. For example, in the case that the transmission of the payment information is paused, the electronic device may restart the transmission of the payment information through a voice input or provide a user interface (UI) the user may recognize and restart the transmission of the payment information through selection of the UI. In another example, in the case that the transmission of the payment information is paused, the electronic device may restart the transmission of the payment information when a payment point-of-sales (POS) and the electronic device are close to each other by a designated distance. In another example, in the case that the transmission of the payment information is paused, the electronic device may detect movement thereof through a motion detection sensor thereof and restart the transmission of the payment information. In another example, in the case that the transmission of the payment information is paused, the electronic device may restart the transmission of the payment information by the user's operation of withdrawing the electronic device. Control regarding transmission of payment information may be enabled by other various inputs as well as an input according to the above-described embodiments.

FIG. 17 is a view for describing an operation of controlling a phone call function based on a pressure input during execution of the phone call function according to various embodiments of the present disclosure.

Referring to FIG. 17, the electronic device (e.g., the electronic device 101) may control a phone call function based on a pressure input and/or a duration of the pressure input.

According to various embodiments of the disclosure, the electronic device (e.g., the electronic device 101) may control a hardware component such as a microphone, a speaker, etc., associated with a phone call through a user's pressure input during the phone call. For example, in the case that a user's pressure input is detected on an ongoing call screen of the electronic device, an adjacent region of a hardware component (e.g., a microphone, a speaker, a volume button, etc.), a designated region, etc., the electronic device may control the hardware component corresponding to the region of the pressure input. In another example, in the case that the electronic device does not include a physical button (e.g., a home button) configured to execute a specific function, the electronic device may perform a function corresponding to the physical button upon detecting a pressure input with respect to at least a partial region, which corresponds to the physical button, on the display. Upon detecting the pressure input on the at least a partial region, e.g., the first region, the electronic device may perform a function of the home button.

According to various embodiments of the disclosure, the electronic device may control the function corresponding to the physical button even when including the physical button. Thus, by applying a pressure to the screen without needing to search for the physical button, an operation of the electronic device may be easily controlled.

According to various embodiments of the disclosure, the electronic device may control a component thereof based on a strength of a pressure. For example, when the user applies a pressure input of the first strength to a phone call screen during a phone call and maintains the pressure input, the electronic device (e.g., the electronic device 101) may transmit silence by removing an input of a transmitting microphone. In another example, when the user applies a pressure input of the second strength to the phone call screen during a phone call and maintains the pressure input, the electronic device may record the call.

According to various embodiments of the disclosure, when the user releases the pressure input, the electronic device may return to a state of a phone call operation performed prior to application of the pressure input.

Figures 17A, 17B:
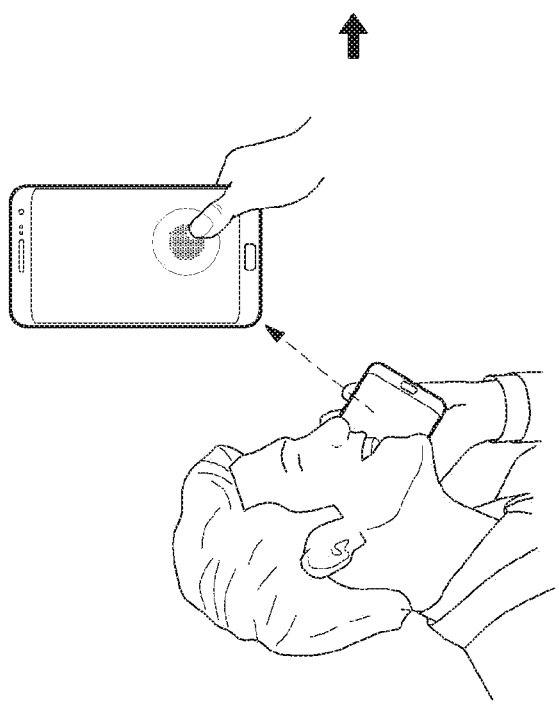
FIG. 17 is a view for describing an operation of controlling a phone call function based on a pressure input during execution of the phone call function according to various embodiments of the present disclosure.

According to various embodiments of the disclosure, as illustrated in FIG. 17a, the user may easily control a hardware component of the electronic device through the pressure input during the phone call without seeing the screen. Referring to FIG. 17b, control of a hardware component of the electronic device may be set based on a strength of a pressure. As illustrated in FIG. 17b, a pressure strength of a first pressure may be set greater than or equal to the first threshold value and less than the second threshold value, and upon reception of the first pressure during a phone call, the microphone of the electronic device may be deactivated. A pressure strength of a second pressure may be set greater than or equal to the second threshold value, and upon reception of the second pressure during a phone call, a recording function of the electronic device may be activated.

According to various embodiments of the disclosure, the electronic device (e.g., the electronic device 101) may control some functions of the electronic device based on a pressure input as below, though not shown.

According to various embodiments of the disclosure, although not shown, the electronic device may display a UI (e.g., a function button, etc.) for function control. Apart from activation or deactivation of a function using a touch input with respect to the UI for function control, a control operation may be provided by maintenance of a pressure input applied to the UI for function control. For example, on the screen where a dialing button is provided, together with selection of a function corresponding to the dialing button through a touch input, a function (e.g., call recording) corresponding to a pressure applied to the dialing button may be activated through the pressure input and maintenance of the pressure input. Upon release of the pressure, the activation of the function corresponding to the dialing button may be terminated. In another example, upon release of the pressure, the activation of the function (e.g., call recording) corresponding to the dialing button may be terminated.

According to various embodiments of the disclosure, although not shown, together with control of activation or deactivation of a recording function corresponding to a recording icon by selecting the recording icon to use the recording function during execution of the recording function, activation or deactivation of a recording section may be controlled using a duration of a pressure input applied to the icon. For example, upon start of application of the pressure input, the recording function may be activated, and upon release of the pressure input, the recording function may be deactivated. In another example, upon start of application of the pressure input during the activation of the recording function, the recording function may be deactivated, and upon release of the pressure input, the recording function may be activated.

According to various embodiments of the disclosure, although not shown, during recording of the phone call, the recording function may be selected or adjusted by the pressure input. For example, upon start of application of the pressure input during recording of the phone call, a time at which the pressure input is applied is identified, and upon release of the pressure input, a time at which the pressure input is released is identified, a recording section between the application time and the release time may be selected and may be generated as one file. Upon start of application of the pressure input during recording of a phone call, recording of the phone call is held, and upon release of the pressure input, the held recording may be resumed.

According to various embodiments of the disclosure, although not shown, the electronic device may execute a different control operation based on a position where the pressure input is maintained. For example, for the pressure input maintained near the microphone of the electronic device, an input of the microphone may be controlled, and for the pressure input maintained near the speaker, a volume of the speaker may be controlled. An operation of controlling the input of the microphone may include activating or deactivating a function of the microphone during maintenance of the pressure input of the user, and an operation of controlling the speaker may include activating or deactivating the speaker during maintenance of the pressure input of the user. In another example, when the user releases the pressure input, the electronic device may return to an operating state previous to application of the pressure input.

According to various embodiments of the disclosure, the microphone and the speaker have been taken as an example in the above description, but the same operation may be applied to a screen region where a UI for controlling various physical buttons such as a volume button, a power button, etc., is displayed, a connector region, e.g., an earphone jack, connected with an external device, or a housing.

According to various embodiments of the disclosure, although not shown, when using a flash function through a flash operation, the electronic device may control the flash function by using a pressure input and/or maintenance of the pressure input. For example, the flash function of the flash application of the electronic device (e.g., the electronic device 101) may be executed to generate light only during maintenance of a pressure input after application of the pressure input, and upon release of the pressure input, execution of the flash function of the flash application may be paused. The flash application may be implemented with an existing on/off toggle icon, and the flash application may operate as a toggle switch upon application of a touch input to the icon, and the flash function may be activated upon application of the pressure input and during maintenance of the pressure input.

According to various embodiments of the disclosure, although not shown, the electronic device (e.g., the electronic device 101) may control a function of the camera by using a pressure input and/or a duration of the pressure input. For example, although not shown, upon detecting a user's pressure input during recording of a moving image through a camera application, the electronic device may hold the recording for a duration of the pressure input. In another example, although not shown, when operating in a still image capturing mode, upon detecting the user's pressure input, the electronic device may capture a moving image for a duration of the pressure input. That is, a different function may be performed based on a type of a user input (a user's selection type) with respect to one icon.

According to various embodiments of the disclosure, although not shown, upon detecting a touch input with respect to a photographing icon of the camera application, the electronic device may store a current preview image as a still image. In another example, upon detecting a pressure input with respect to the photographing icon of the camera application, the electronic device may store the current preview image as a moving image for a duration of the pressure input.

According to various embodiments of the disclosure, although not shown, upon detecting an additional pressure input or further detecting a pressure input having a different strength, while storing the moving image during maintenance of the pressure input, the electronic device may store the moving image and at the same time, may further store a still image of a part to which the pressure is applied.

According to various embodiments of the disclosure, although not shown, in the case that during maintenance of the pressure input, another pressure is input or a pressure having a different level or strength that is higher than that of a previous pressure is newly applied, the electronic device (e.g., the electronic device 101) may change from a first operation state to a second operation state.

According to various embodiments of the disclosure, although not shown, the electronic device (e.g., the electronic device 101) may change from the first operation state to the second operation state based on the number of additional inputs newly applied during maintenance of the pressure.

According to various embodiments of the disclosure, the electronic device (e.g., the electronic device 101) may be provided with a particular function by using an input value of another external sensor such as a touch sensor, an acceleration sensor, a fingerprint sensor, etc., as well as the input of the pressure sensor.

Figure 18:
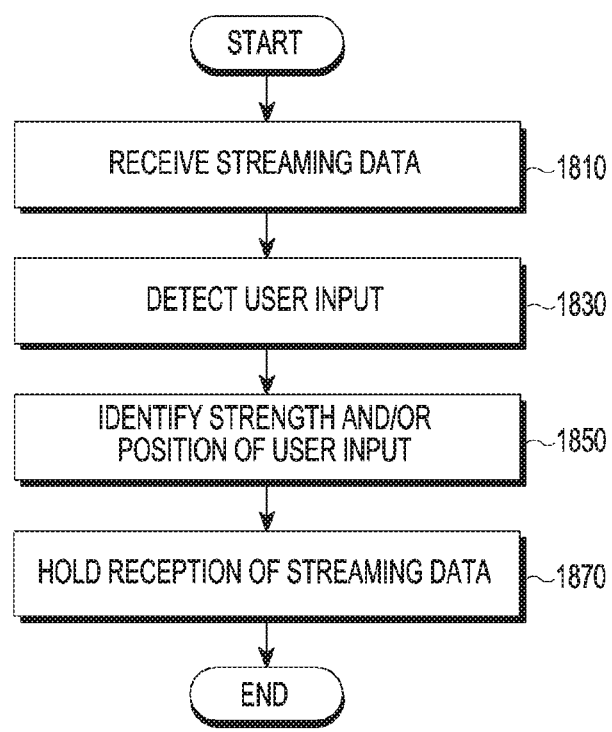
FIG. 18 is a flowchart of a method of controlling a media player using a pressure input according to various embodiments of the present disclosure.

FIG. 18 is a flowchart of a method of controlling a media player using a pressure input according to various embodiments of the present disclosure.

According to various embodiments of the disclosure, the electronic device (e.g., the electronic device 101) may execute a network control operation during playback of streaming data of a media player by using a pressure input and/or a duration thereof. For example, the network control operation may include temporarily pausing reception of streaming data or limiting the amount of reception data based on a pressure input, upon detecting the pressure input.

According to various embodiments of the disclosure, the electronic device may receive streaming data over a network, in operation 1810. For example, the electronic device may receive streaming data for an image through a wireless communication circuit, and play the received streaming data. The electronic device may play the received streaming data while receiving the streaming data.

According to various embodiments of the disclosure, the electronic device may detect a user input, in operation 1830. For example, the user input may be a pressure input.

According to various embodiments of the disclosure, the electronic device may identify a pressure strength and/or a position of the user input, in operation 1850.

The description of operation 1850 may correspond to operation 630 of FIG. 6 and operation 730 of FIG. 7, and the detailed description thereof may be omitted.

According to various embodiments of the disclosure, in operation 1870, the electronic device may hold (or pause) reception of the streaming data based on the user input, stop downloading of the streaming data, or download the streaming data of up to an amount corresponding to a position where the pressure input is detected. The holding may include temporarily stopping reception of the streaming data, and may include receiving the streaming data from the temporarily stopped part upon release of the holding. The stop may include completely stopping downloading of the streaming data, and may include downloading the streaming data from the beginning upon release of the stop.

According to various embodiments of the disclosure, the electronic device may hold reception of the streaming data, upon detecting the user input of a magnitude greater than or equal to a designated magnitude during reception of the streaming data as in operation 1850.

According to various embodiments of the disclosure, when the electronic device (e.g., the electronic device 101) receives and plays back the streaming data, while a pressure input of the user is applied and the pressure input is maintained, the electronic device may prevent downloading of data that is not needed for the user by executing playback of data downloaded in a buffer without further data downloading. For example, for a playback speed of an image, 2 Mbps, and a download speed of a network, 10 Mbps, the electronic device may download all data of contents of 100 MB in 10 seconds. When the user searches for an image and terminates the image after watching the image for 10 seconds, the electronic device may discard already downloaded redundant data of 80 MB without using the same, causing unnecessary network consumption. According to the above-described embodiments of the disclosure, when an image of streaming data is played back simultaneously with reception of the streaming data, in the case that a pressure input is applied after, for example, 1 second from, playback of the image, and the pressure input is maintained, the electronic device may stop reception of the streaming data and play back only the already received streaming data of 10 MB, thus preventing unnecessary streaming data reception.

According to various embodiments of the disclosure, when receiving and playing back streaming data, upon detecting the user's pressure input, the electronic device (e.g., the electronic device 101) may download data of up to an amount corresponding to a position where the pressure input is detected.

According to various embodiments of the present disclosure, upon detecting a user's pressure input while receiving streaming data of an image or a sound source or data of a browser such as a web document, an image, etc., the electronic device (e.g., the electronic device 101) may perform at least one of pause, resumption, or restart of reception of the data of the browser or the streaming data. In another example, a size of a buffer that stores the data of the browser or the streaming data may be adjusted based on at least one of a duration of the pressure input or a level of the pressure input.

Figure 19A:
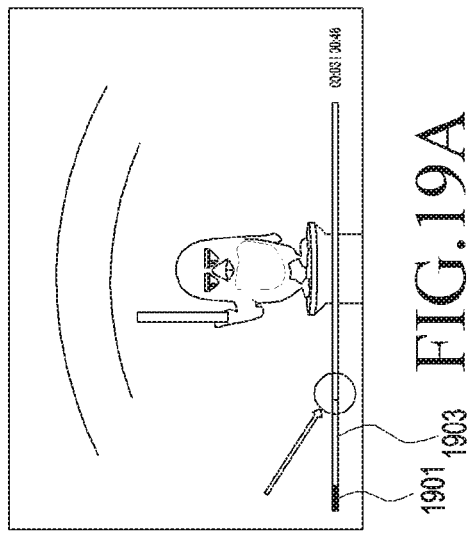
FIG. 19 is a view for describing an operation of controlling a streaming data download function based on a pressure input during execution of the download function according to various embodiments of the present disclosure.
Figure 19B:
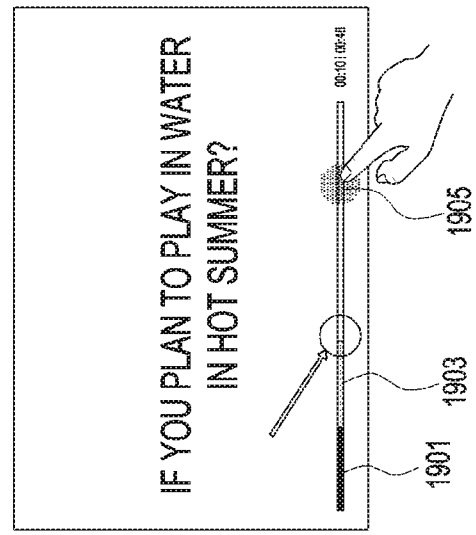
Figure 19C:
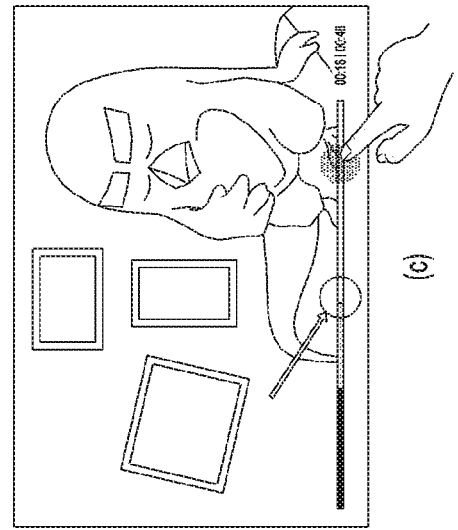

FIG. 19 is a view for describing an operation of controlling a streaming data download function based on a pressure input during execution of the download function according to various embodiments of the present disclosure.

Referring to FIG. 19, upon detecting a pressure input while downloading streaming data, the electronic device may stop or hold downloading of the streaming data.

According to various embodiments of the disclosure, when playing back an image of streaming data during downloading of the streaming data, the electronic device (e.g., the electronic device 101) may display a visual effect 1901 corresponding to a time of the played image and a visual effect 1903 corresponding to the downloaded data amount, as illustrated in FIG. 19a. As illustrated in FIG. 19b, upon detecting a pressure input 1905, the electronic device may stop downloading the data. According to various embodiments of the disclosure, although not shown, the electronic device may stop downloading the data and play back an image corresponding to the downloaded data amount, by using a strength, a duration, a position, etc., of the pressure input. For example, after receiving data of only a designated amount corresponding to a strength of a pressure input, the electronic device may stop receiving the data. In another example, after receiving data for only a duration of the pressure input, the electronic device may stop receiving the data. In another example, after receiving data of only a designated amount corresponding to a position of a pressure input, the electronic device may stop receiving the data. The position of the pressure input may be any point on a state bar in which the visual effect 1901 corresponding to a time of the played image and a visual effect 1903 corresponding to the downloaded data amount are displayed in FIG. 19.

According to various embodiments of the disclosure, although not shown, the electronic device (e.g., the electronic device 101) may adjust a size of a physical or logical data storage (a data buffer) based on a strength of a pressure input, thus preventing unnecessary data downloading.

According to various embodiments of the disclosure, the electronic device may set a buffer corresponding to a preset level of a strength of a pressure input. For example, the electronic device may set a buffer for playback of an image of 3 seconds for a first-level strength of the pressure input of the user, a buffer for playback of an image of 5 seconds for a second-level strength of the pressure input, and a buffer for playback of an image of 10 seconds for a third-level strength of the pressure input. A change of the buffer and a state of the current buffer may be indicated using a color, a mark, a character, etc., on a play state bar.

According to various embodiments of the disclosure, although not shown, the electronic device (e.g., the electronic device 101) may adjust a size of a physical or logical data storage based on a duration of a pressure input, thus preventing unnecessary data downloading. According to various embodiments of the disclosure, the electronic device may set a buffer corresponding to a preset section of a duration of a pressure input. For example, the electronic device may set a buffer for playback of an image of 3 seconds for a first section of the duration of the pressure input of the user, a buffer for playback of an image of 5 seconds for a second section of the duration of the pressure input, and a buffer for playback of an image of 10 seconds for a third section of the duration of the pressure input. A change of the buffer and a state of the current buffer may be indicated using a color, a mark, a character, etc., on a play state bar. The size of the set buffer may be further expanded by a repeated pressure input or an additional pressure input.

According to various embodiments of the disclosure, although not shown, in the case that a pressure input is maintained over a third section of a preset pressure input duration including first through third sections, the electronic device (e.g., the electronic device 101) may operate in a circular queue manner to return to the same state as a pressure of the first section. That is, when the pressure input is maintained without an additional pressure input, the electronic device may adjust the size of the buffer repeatedly for 3 seconds, 5 seconds, 10 seconds, 3 seconds, 5 seconds, 10 seconds, and the like based on a duration of the pressure input, and upon detecting a user's additional pressure input or a change in a pressure strength in this state, the electronic device may increase the buffer size proportionally to the duration. That is, in the case that an additional pressure input is applied in the first section of the pressure input duration, the electronic device may increase the buffer size by multiples of 3 seconds, 6 seconds, 9 seconds based on the number of additional pressure inputs. To sum up, the electronic device may provide attributes of a function executed in the electronic device based on a pressure strength, repetition, and a duration of a pressure input.

According to various embodiments of the disclosure, although not shown, setting of a play buffer may be changed adaptively to a change of a state of the network. For example, the electronic device may set the play buffer based on a strength or a duration of a pressure input and/or a network state change by checking a change of a state of the network.

FIGS. 20 through 22 are views for describing an operation of controlling a scroll function of an electronic document based on a pressure input according to various embodiments of the present disclosure.

Referring to FIGS. 20 through 22, by using a pressure input and/or a duration thereof, the electronic device (e.g., the electronic device 101) may control display of an electronic document of an e-mail application, a browser, a word processor, or the like.

Referring to FIG. 20, the electronic device may scroll an electronic document based on a pressure input and/or scrolling of the pressure input, and may display a screen of the electronic document prior to the scrolling upon release of the pressure input. For example, during execution of the electronic document, upon detecting a pressure input of the first strength, maintenance of the pressure input of a particular strength or higher (or maintenance of a touch input in the pressure input position), and a change of a direction of the pressure input in a direction based on scrolling, movement, or the like, the electronic device (e.g., the electronic device 101) may execute a scroll operation to correspond to the direction. The particular strength of the pressure input may be equal to, greater than, or less than the first strength. Upon release of the pressure input, a temporary scrolling and referencing operation that returns to an initial scroll start position may be performed. A scroll bar indicating a page position previous to application of a pressure input may be displayed.

Figures 20A, 20B, 20C:
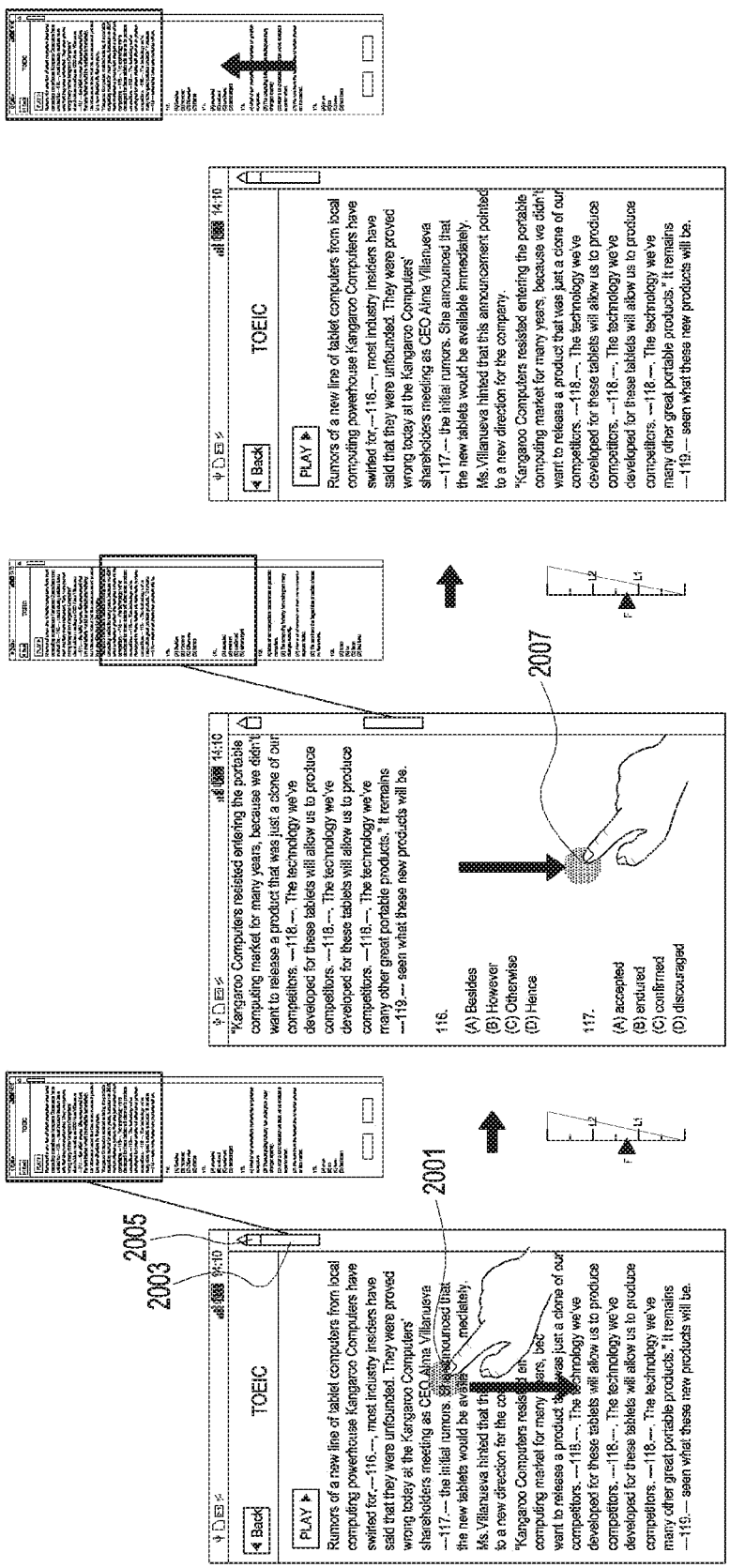
FIGS. 20 through 22 are views for describing an operation of controlling a scroll function of an electronic document based on a pressure input according to various embodiments of the present disclosure.

According to various embodiments of the disclosure, when performing a scroll operation using a pressure input, the electronic device may display information about a state previous to application of the pressure input or an operation performed by the pressure input. For example, referring to FIGS. 20a to 20c, a pressure input 2001 applied by the user to an electronic document as illustrated in FIG. 20a may be detected. When detecting the pressure input, the electronic device may store or display information about a state corresponding to pressure detection. For example, the electronic device may display a first scroll bar 2003 indicating a current page position and a second scroll bar 2005 indicating a page position previous to application of the pressure input. Upon detecting scrolling 2007 of the pressure input in a downward direction on an electronic document as illustrated in FIG. 20b, the electronic device may perform scrolling in the downward direction, and move the first scroll bar 2003 to a position corresponding to the current page position along with the scrolling operation even though a position of the second scroll bar 2005 is not moved.

According to various embodiments of the disclosure, the scrolling 2007 of the pressure input may include executing a scroll gesture in a state where the user presses the screen with a strength greater than or equal to the first strength, or executing the scroll gesture in a state where the user presses or touches the screen with a strength less than the first strength after pressing the screen with the strength greater than or equal to the first strength. According to various embodiments of the disclosure, upon detecting release of the pressure input as illustrated in FIG. 20c, the electronic device may move to the position at which the scrolling starts initially.

Referring to FIGS. 21 and 22, the electronic device (e.g., the electronic device 101) may scroll the electronic document based on a strength of a pressure input 2101 in the unit of a designated size corresponding to the strength, and may display the screen of the electronic document prior to the scrolling upon release of the pressure input 2101.

According to various embodiments of the disclosure, a temporary scrolling operation may be performed in association with a strength of a pressure. For example, the electronic device may scroll the electronic document by sentence upon detecting scrolling of the pressure input of the first strength, by paragraph upon detecting scrolling of the pressure input of the second strength, and by page upon detecting scrolling of the pressure input of the third strength, after which upon detecting release of the pressure input, the electronic device may move the screen to a position at which the scrolling starts initially.

According to various embodiments of the disclosure, a temporary scrolling operation may be performed in association with a continuous pressure input. For example, the electronic device may scroll the electronic document to a first paragraph upon detecting scrolling of the pressure input of the first strength, to a second paragraph upon detecting scrolling of the pressure input of the second strength, and to a third paragraph upon detecting scrolling of the pressure input of the third strength, after which upon detecting release of the pressure input, the electronic device may move the screen to the position at which the scrolling starts initially. In another example, the electronic device may scroll the electronic document to the first paragraph upon detecting input of a scroll gesture in a state where the user presses or touches the screen with a strength greater less than the first strength after detecting the pressure input of the first strength, to the second paragraph upon detecting input of the scroll gesture in a state where the user presses or touches the screen with a strength greater less than the second strength after detecting the pressure input of the second strength, and to the third paragraph upon detecting input of the scroll gesture in a state where the user presses or touches the screen with a strength greater less than the third strength after detecting the pressure input of the third strength, after which upon detecting release of the pressure input, the electronic device may move the screen to the position at which the scrolling starts initially.

According to various embodiments of the disclosure, when performing the temporary scroll operation, the electronic device may display information about a state previous to application of the pressure input or an operation performed by the pressure input. For example, the electronic device may display a page position previous to application of the pressure input on the scroll bar and may display an arrow, etc., to indicate scrolling. The information about the operation may be provided in combination of various effects such as visual, tactile, auditory effects, etc.

Figure 21A:
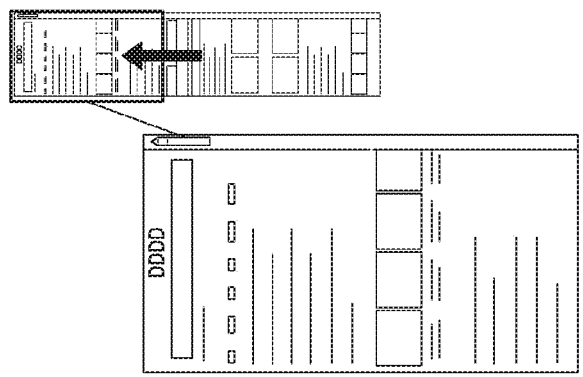
Figure 21B:
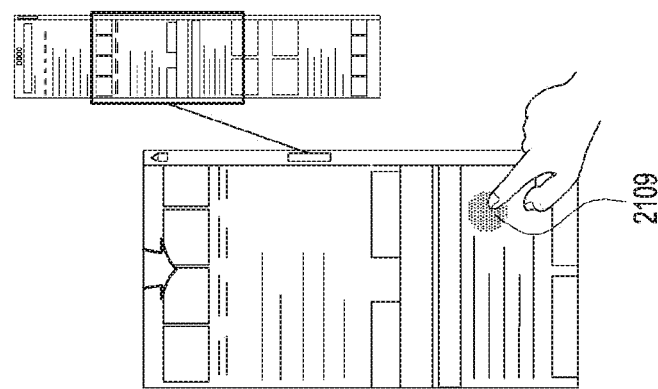
Figure 21C:
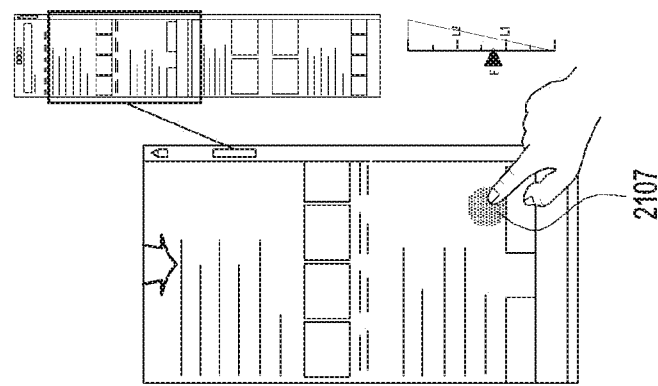
Figure 21D:
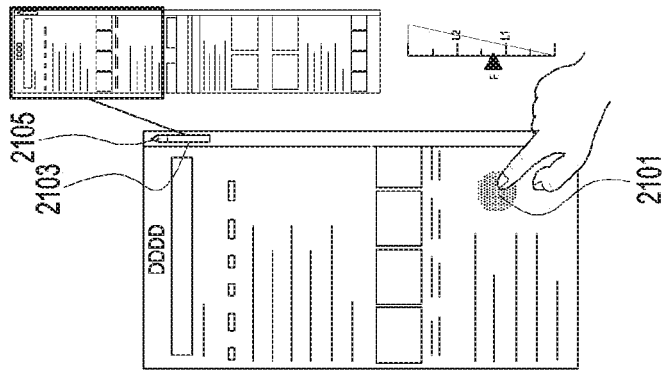

According to various embodiments of the disclosure, upon detecting a pressure input 2101 of the first strength applied to an electronic document as illustrated in FIG. 21a, the electronic device may scroll the screen by designated size (e.g., paragraph) corresponding to the first strength as illustrated in FIG. 21b. The electronic device may display a first scroll bar 2103 indicating a current page position and a second scroll bar 2105 indicating a page position previous to application of the pressure input. Upon detecting a pressure input 2107 of the first strength applied to the electronic document as illustrated in FIG. 21*b*, the electronic device may scroll the screen by designated size corresponding to the first strength as illustrated in FIG. 21*c*, and upon release of a pressure input 2109, the electronic device may move to the initial screen as illustrated in FIG. 21*d*.

Figure 22A:
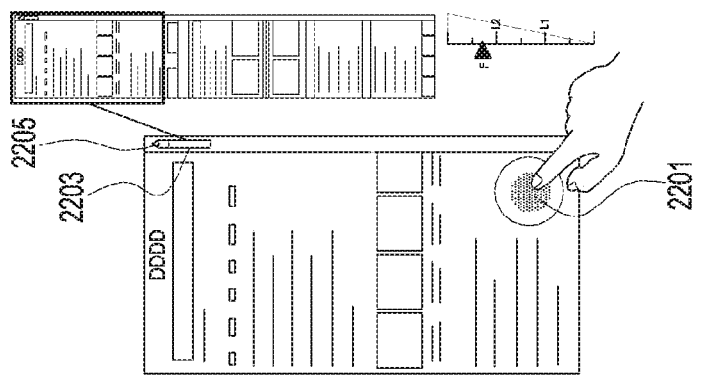
Figure 22B:
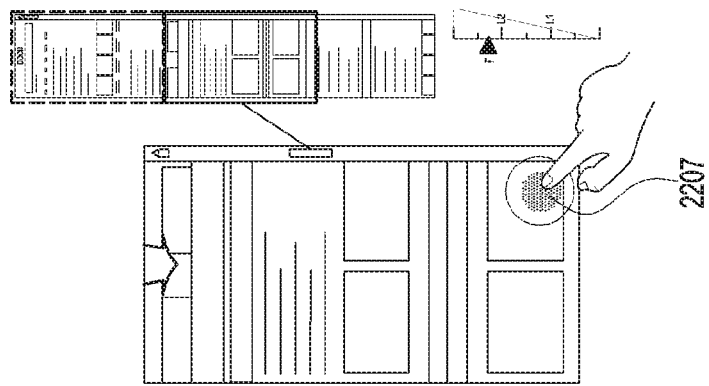
Figure 22C:
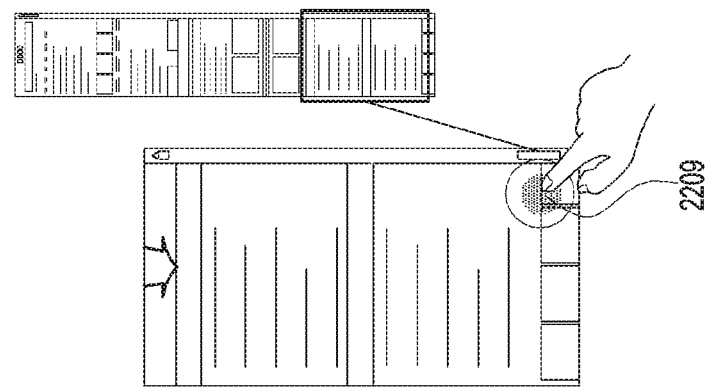
Figure 22D:
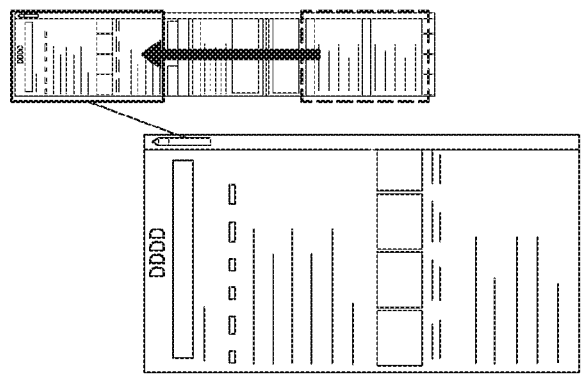

According to various embodiments of the disclosure, upon detecting a pressure input 2201 of the second strength applied to the electronic document as illustrated in FIG. 22*a*, the electronic device may scroll the screen in the unit of a designated size (e.g., a screen display unit of the electronic device) corresponding to the second strength as illustrated in FIG. 22*b*. The electronic device may display a first scroll bar 2203 indicating a current page position and a second scroll bar 2205 indicating a page position previous to application of the pressure input. Upon detecting a pressure input 2207 of the second strength applied to the electronic document as illustrated in FIG. 22*b*, the electronic device may scroll the screen by designated size as illustrated in FIG. 22*c*, and upon release of a pressure input 2209, the electronic device may move to the initial screen as illustrated in FIG. 22*d*.

Figure 24A:
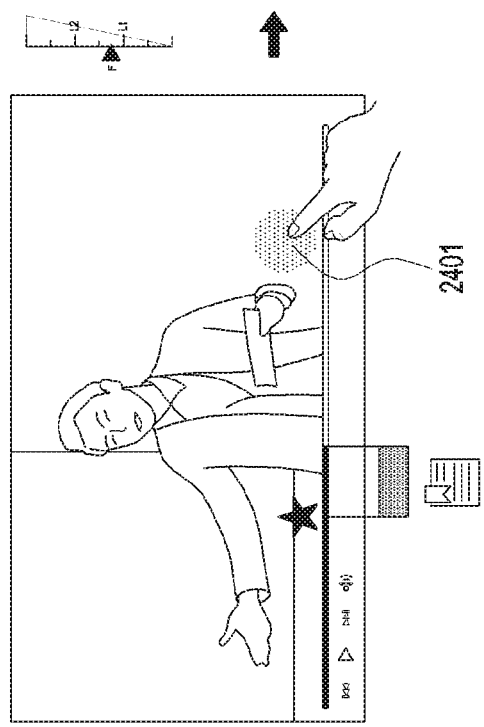
Figure 24B:
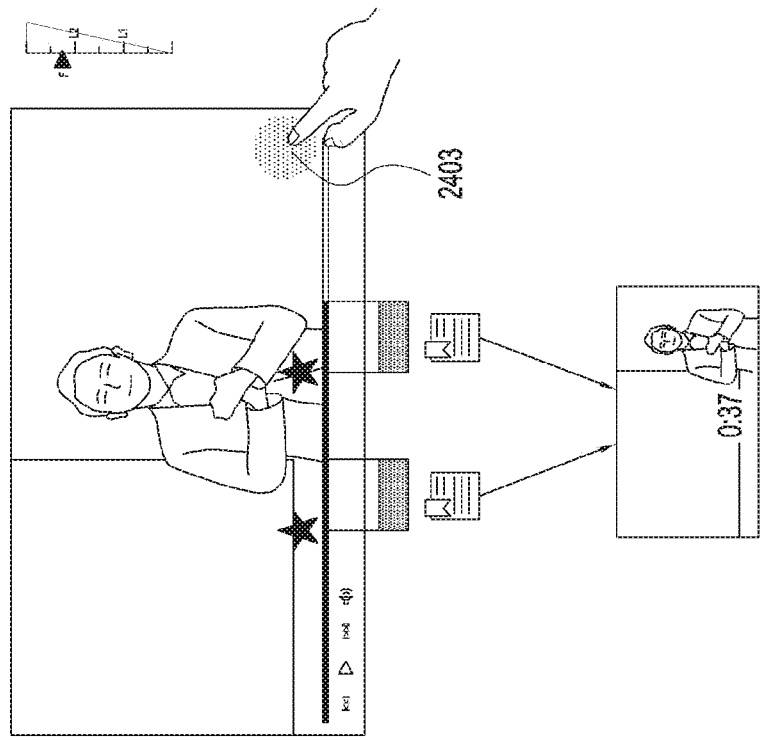

FIGS. 23 and 24 are views for describing an operation of controlling a media player based on a pressure input during execution of a function of the media player according to various embodiments of the present disclosure.

Referring to FIG. 23, the electronic device (e.g., the electronic device 101) may generate at least one bookmark or file based on a pressure input and/or a duration thereof during execution of the media player application. According to various embodiments of the disclosure, upon detecting a pressure input 2301 applied to a play screen during playback of an image through the media player application as illustrated in FIG. 23*a*, the electronic device may generate a bookmark or a file based on a strength of the pressure input during maintenance of the pressure input as illustrated in FIG. 23*b*. For example, upon detecting the pressure input of the first strength on the play screen during playback of the image through the media player application, the electronic device may generate a bookmark of the image for a play time during maintenance of the pressure input. In another example, upon detecting the pressure input of the second strength on the play screen, the electronic device may store the image corresponding to a duration of the pressure input in the buffer during maintenance of the pressure input and store an independent file (image clip) by user's selection. It has been described in the above embodiment that the electronic device generates the bookmark of the image based on the pressure input of the first strength and stores the image as an independent file based on the pressure input of the second strength, but the electronic device may also store the image as the independent file based on the pressure input of the first strength and generate the bookmark of the image based on the pressure input of the second strength. In another example, the electronic device may simultaneously store the image as the independent file based on the pressure input and generate the bookmark.

Referring to FIG. 24, the electronic device (e.g., the electronic device 101) may generate one file by repeatedly setting a plurality of sections for the one file through reception of a pressure input. For example, as illustrated in FIG. 24*a*, upon detecting a pressure input 2401 of the first strength on a play screen during playback of an image through the media player application, the electronic device may store a first image corresponding to a duration of the pressure input 2401 in the buffer, and upon detecting a pressure input 2403 of the second strength on the play screen after elapse of a specific time from detection of release of the pressure input 2401, the electronic device may store a second image corresponding to a duration of the pressure input 2403 in the buffer. Thereafter, the electronic device may generate the first image and the second image as one file.

According to various embodiments of the disclosure, generation of an image corresponding to a plurality of sections as one file through repetition of a pressure input and maintenance of the pressure input may be performed by pressure inputs of the same strength unlike in FIG. 24.

According to various embodiments of the disclosure, although not shown, the electronic device (e.g., the electronic device 101) may operate to generate different files based on one pressure input. Such setting may be determined based on user's selection in the form of pop-ups corresponding to maintenance and release of a pressure input of the user.

According to various embodiments of the disclosure, although not shown, upon detecting a pressure input of the third strength, the electronic device (e.g., the electronic device 101) may designate an image corresponding to a duration of the pressure input as a preview image and allow the user to identify details of the image without executing a video player.

FIG. 25 is a view for describing an operation of controlling a media player based on a pressure input during execution of a function of the media player according to various embodiments of the present disclosure.

Figures 25A, 25B:
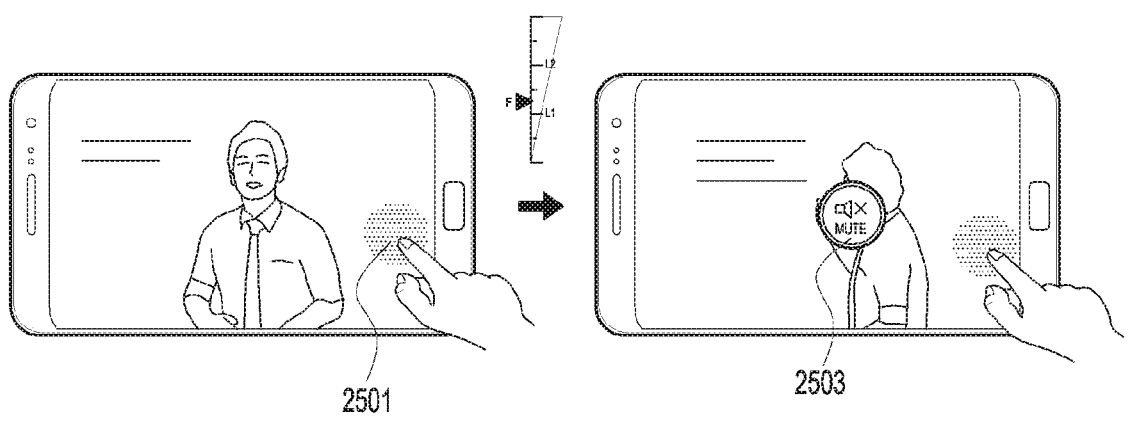
FIG. 25 is a view for describing an operation of controlling a media player based on a pressure input during execution of a function of the media player according to various embodiments of the present disclosure.
Figure 25C:
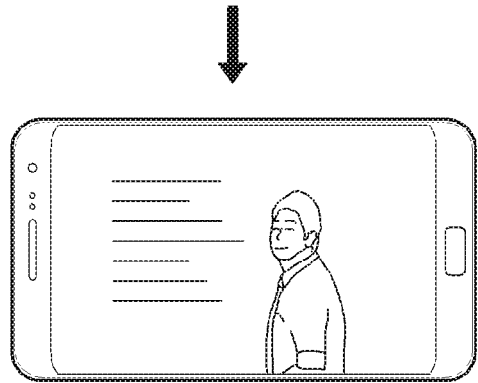

Referring to FIG. 25 according to various embodiments of the disclosure, the electronic device (e.g., the electronic device 101) may execute a mute function to continuously play music or a moving image while removing audio from the music or the moving image played by the multimedia player based on a pressure input during execution of the multimedia player. For example, upon detecting a pressure input 2501 of the first strength on the play screen during playback of the music or the moving image through the media player as illustrated in FIG. 25*a*, the electronic device may enter a mute state where the electronic device maintains playback of the sound source while removing the audio of the currently played sound source or maintain playback of the moving image while removing the audio of the currently played moving image, during maintenance of the pressure input. In another example, the electronic device may display a visual effect 2503 indicating the mute state on the screen. As illustrated in FIG. 25*c*, when the user releases the pressure input, the electronic device may release the mute state.

FIG. 26 is a view for describing an operation of controlling a media player based on a pressure input during execution of a function of the media player according to various embodiments of the present disclosure.

Figures 26A, 26B:
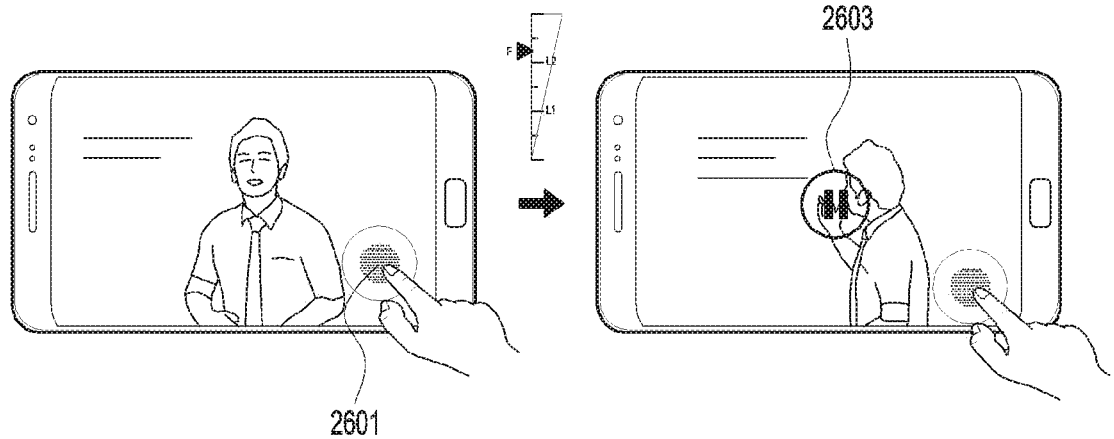
FIG. 26 is a view for describing an operation of controlling a media player based on a pressure input during execution of a function of the media player according to various embodiments of the present disclosure.
Figure 26C:
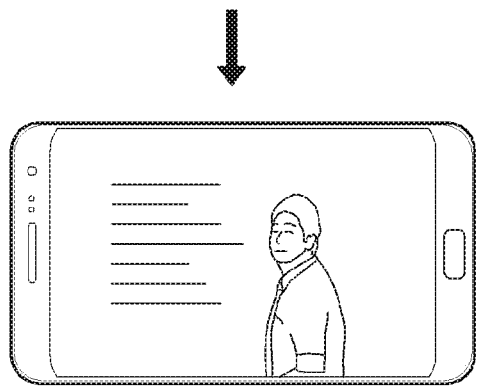

Referring to FIG. 26, the electronic device (e.g., the electronic device 101) may hold (or temporarily stop) music or a moving image played by the media player based on a pressure input during execution of the media player. For example, upon detecting a pressure input 2601 of the second strength on the play screen during playback of music or a moving image through the multimedia player as illustrated in FIG. 26*a*, the electronic device may hold the currently played music or moving image, and during maintenance of the pressure input, the electronic device may maintain a hold state as illustrated in FIG. 26*b*. Thereafter, as illustrated in FIG. 26*c*, upon detecting release of the pressure input, the electronic device may return to a play state of the music or the moving image previous to the holding.

According to various embodiments of the disclosure, although not shown, during playback of the music or the moving image through the media player, the electronic device (e.g., the electronic device 101) may maintain the mute state while the user applies the pressure input of the first strength and maintains the pressure input, and upon further applying the pressure input of the second strength or repeating application of the pressure input of the first strength, during maintenance of the pressure input, the electronic device may enter the hold state in the mute state. In another example, when the user releases the pressure input, the electronic device may return to a normal play state. In another example, a duration of the hold state may be designated based on a strength of a pressure, and when the user applies a pressure input during playback of music or a moving image through the media player, the electronic device may hold the playback during a time corresponding to a strength of the applied pressure input. In another example, the electronic device may enter the mute state or the hold state based on a position of the pressure input.

FIG. 27 is a view for describing an operation of controlling a media player based on a pressure input during execution of a function of the media player according to various embodiments of the present disclosure.

Figure 27A:
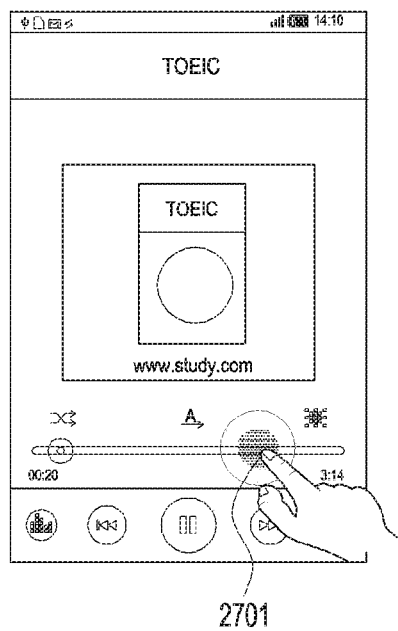
FIG. 27 is a view for describing an operation of controlling a media player based on a pressure input during execution of a function of the media player according to various embodiments of the present disclosure.
Figure 27B:
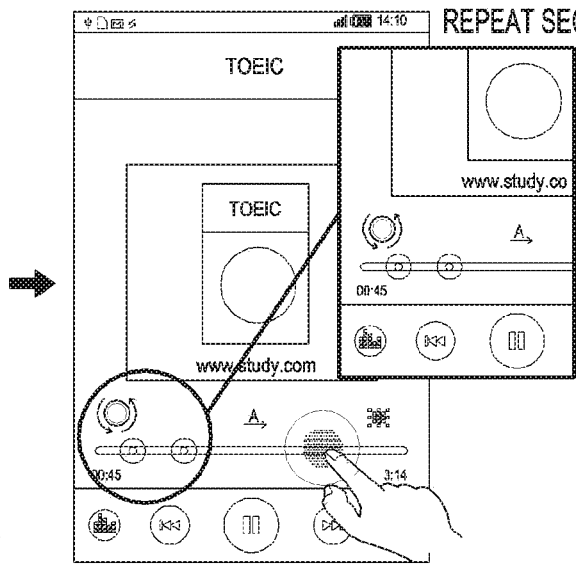

Referring to FIG. 27, the electronic device (e.g., the electronic device 101) may set a particular play section as a repetitive play section based on a pressure input during execution of the media player. According to various embodiments of the disclosure, the electronic device may set a repetitive play section of the media player by using a pressure input and maintenance thereof. For example, upon detecting a pressure input of a designated strength, the electronic device may designate as a first point, a point played by the media player at the time when the pressure input is detected. Upon release of the pressure input of the designated strength, the electronic device may designate as a second point, a point played by the media player at the time when the pressure input is released, and operate a section that is at least partially adjacent to the first point and the second point as a repetitive play section. In another example, the electronic device may set a section from initial detection of the pressure input to detection of release of the pressure input as a repetitive section and operate the set section as a repetitive play section for language learning, etc. During playback of the media player, in the case that the user applies a pressure input 2701 at a first time as illustrated in FIG. 27a and maintains the pressure input 2701 as illustrated in FIG. 27b, then the electronic device may set a play section corresponding to a duration of the pressure as a repetitive play section.

Figure 28:
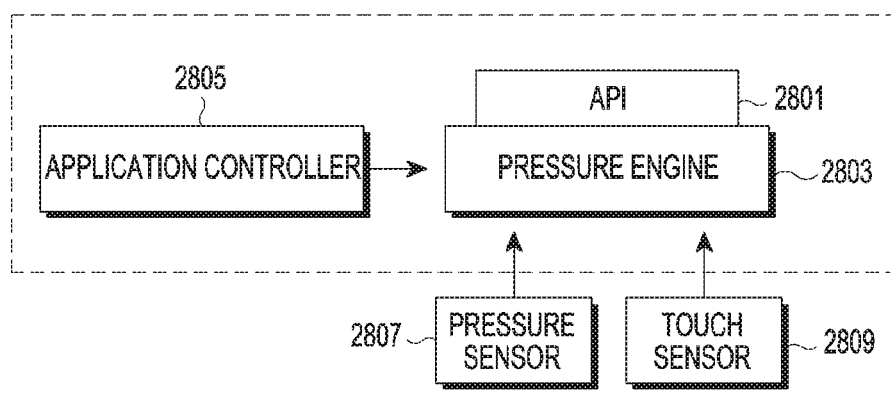
FIG. 28 illustrates a software configuration for a 3rd-party application in an operating system (OS) of an electronic device according to various embodiments of the present disclosure.

According to various embodiments of the disclosure, although not shown, even when the first strength is not maintained after application of the pressure input of the first strength, the electronic device may maintain an operation corresponding to the pressure input of the first strength. For example, upon detecting maintenance of a strength of the pressure input, which is less than the first strength, constant after application of the pressure input of the first strength, the electronic device may maintain an operation corresponding to the pressure input of the first strength. In another example, upon detecting maintenance of the first strength of the pressure input after application of the pressure input of the first strength, the electronic device may maintain an operation corresponding to the pressure input of the first strength. In another example, upon detecting reduction in the strength of the pressure input after application of the pressure input of the first strength, the electronic device may maintain an operation corresponding to the pressure input of the first strength. According to various embodiments of the disclosure, although not shown, the electronic device may detect an additional pressure input after application of the pressure input of the first strength and perform an operation corresponding to the additional pressure input. For example, upon detecting a continuous increase in a strength of the pressure input after application of the pressure input of the first strength, the electronic device may execute an operation corresponding to the additional pressure input. In another example, upon detecting a strength greater than or equal to a second threshold value after detecting a strength greater than or equal to a first threshold value continuously after application of the pressure input of the first strength, the electronic device may perform an operation corresponding to the additional pressure input. In another example, upon detecting a separate pressure input after application of the pressure input of the first strength, the electronic device may perform an operation corresponding to the additional pressure input. In another example, upon detecting the strength corresponding to the first threshold value and then detecting the strength corresponding to the first threshold value again after application of the pressure input of the first strength, the electronic device may perform an operation corresponding to the additional pressure input. FIG. 28 illustrates a software configuration for a 3rd-party application in an OS of an electronic device according to various embodiments of the present disclosure.

Referring to FIG. 28, the above-described embodiments may be provided in the form of an application program interface (API) for a 3rd-party application in an OS of the electronic device.

According to various embodiments of the disclosure, a software configuration for the 3rd-party application in the OS of the electronic device may include an API 2801, a pressure engine 2803 that receives a pressure input through a pressure sensor 2807 and a touch sensor 2809, and an application controller 2805 for controlling an application to provide processing of the pressure input to the 3rd-party application for the application controller 2805. When the application is the media player, the OS of the electronic device may define and provide the following API to provide processing of the pressure input for the media player to the 3rd-party application.

Screen_PresssureAction(Intensity, _Callback( ))
Landscape_PresssureAction(Intensity, _Callback( ))
MediaPlayer_PressureAction(MediaPlayer, Intensity, _Callback( ))

According to various embodiments of the disclosure, to map an operation of the media player in the 3rd-party application, a strength of a pressure input to be received and an operation corresponding to a strength of the pressure input may be defined and used in case of application of the pressure input to an execution screen of the media player, by using Screen_PresssureAction( ) API provided by the electronic device.

According to various embodiments of the disclosure, although not shown, when the user applies a pressure input to at least a partial region of a currently played image during an operation of the media player, the electronic device (e.g., the electronic device 101) may define an operation to identify a strength of the pressure input, to store a state of the currently executed media player, and to change a state of the media player based on at least a part of the pressure. For example, the electronic device may define an operation to change the currently executed state to a mute mode or to change the play state to the hold state.

According to various embodiments of the disclosure, although not shown, when the user applies a pressure input to the execution screen of the media player during playback of music through execution of the media player, the electronic device (e.g., the electronic device 101) may define an operation to identify a strength of the pressure input, to identify the current play time of the music, and to set a bookmark corresponding to a duration of the pressure input or to store and provide a file corresponding to the duration of the pressure input.

According to various embodiments of the disclosure, although not shown, upon application of a pressure input to the electronic device (e.g., the electronic device 101) (in case of switchover to each state), auditory, tactile, and visual feedbacks may be delivered to the user. For example, the electronic device may play a notification sound each time when switching or returning to each state, and may provide a notification by generating vibration in a position to which the pressure input is applied. A type or strength of vibration may differ with a strength of the applied pressure input or a duration of the pressure input. The electronic device may provide the user with state change information in the form of a text, an emoticon, or a picture through a pop-up or overlay display on the screen. The electronic device may provide the user with a notification through a strength, a color, or blink of the LED of the electronic device based on a state change. When the pressure input is initially applied, is maintained during a specific time or longer, is changed to a particular operation, or is released, the feedback may be provided in the same manner as described above, According to various embodiments of the disclosure, the electronic device (e.g., the electronic device 101) may execute an application program, receive biometric data by using a biometric sensor after executing the application program, transmit a first signal during a selected period after receiving the biometric data, detect a pressure applied to a touch screen display during the selected period by using a pressure sensor, and perform at least one of pause, resumption, or restart of transmission of the first signal at least partially based on the detected pressure in the case that a selected pressure level is detected by the pressure sensor.

According to various embodiments of the disclosure, the biometric sensor may include a fingerprint sensor.

For example, the selected pressure level includes a first level and a second level that is different from the first level, and the electronic device may pause transmission of the first signal upon detecting a pressure of a level greater than or equal to the first level, and resume the paused transmission of the first signal during a remaining period of the selected period upon detecting a pressure of a level less than the first level.

For example, the electronic device may restart transmission of the first signal during the selected period upon detecting a pressure of a level greater than or equal to the second level.

For example, the electronic device may pause transmission of the first signal upon detecting a pressure of a level greater than or equal to the selected pressure level and restart transmission of the first signal during the selected period upon detecting a pressure of a level less than the first level.

According to various embodiments of the disclosure, the electronic device (e.g., the electronic device 101) may execute the application program, receive a user input for executing the function after execution of the application program, detect the pressure applied to the touch screen display by using the pressure sensor during the selected period, and perform at least one of pause, resumption, or restart of execution of the function at least partially based on the detected pressure in the case that a selected pressure level is detected by the pressure sensor during the selected period.

For example, the electronic device may pause execution of the function upon detection of the pressure of the first level or higher, and resume the function during a remaining period of the selected period upon detection of release of the pressure.

For example, the application may include an application for playing an image or a sound source, and the function may include a function to receive streaming data of the image or the sound source.

For example, the electronic device may adjust a size of a buffer that stores the streaming data based on at least one of a duration of the pressure or a level of the pressure.

For example, the electronic device may receive the streaming data of up to an amount corresponding to a position of the pressure.

For example, the application may include an application for playing an image or a sound source, and the function may include a mute function for the image or the sound source.

For example, the electronic device may execute the mute function for the image or the sound source, based on at least one of a duration of the pressure or a level of the pressure.

For example, the electronic device may switch the execution state of the mute function to the execution state of the pause function of the image or the sound source, upon detecting an additional pressure with respect to the touch screen display.

According to various embodiments of the disclosure, the electronic device (e.g., the electronic device 101) may execute an application program, receive a user input for executing at least one of the first function or the second function after executing the application program, detect a pressure applied to the touch screen display during the selected period by using the pressure sensor based on the user input, and perform at least one of pause, resumption, or restart of execution of the first function at least partially based on a detected pressure level in the case that a selected pressure level is detected by the pressure sensor during the selected period based on the user input.

For example, the application may include an application to play the image or the sound source, and the first function may include a function to play the image or the sound source and the second function may include generating a bookmark for a play time of the image or the sound source played by execution of the first function based on a duration of the pressure input.

For example, the application may include an application to play the image or the sound source, and the first function may include a function to play the image or the sound source and the second function may include generating at least one file for the image or the sound source based on a duration of the pressure input for at least one section of the image or the sound source played by execution of the first function.

For example, the application may include an application to play the image, and the first function may include a function to play the image and the second function may include generating a preview image for a section of the image played by execution of the first function based on a duration of the pressure input.

For example, the application may include an application to play the image or the sound source, and the first function may include a function to play the image or the sound source and the second function may include setting a repetitive play section for the image or the sound source played by execution of the first function based on a duration of the pressure input.

According to various embodiments of the disclosure, the electronic device (e.g., the electronic device 101) may receive a user input with respect to a touch screen display, detect a pressure with respect to the touch screen display by using a pressure sensor, execute a designated application at least partially based on the detected pressure upon detecting a selected pressure level is detected by the pressure sensor, and display an execution screen of the application on at least a partial region of the touch screen display.

For example, the electronic device may be configured such that a different application is executed for a different pressure level.

For example, the electronic device may terminate execution of the second application program upon detecting release of the detected pressure.

Upon receiving an additional user input, the electronic device may not terminate execution of the application program even when detecting release of the pressure.

For example, the electronic device may display a full-size execution screen of the application on the entire region of the touch screen display upon receiving the additional user input.

For example, the electronic device may further include a motor for converting an electric signal into mechanical vibration, and the electronic device may provide at least one of a feedback displaying on the touch screen display, a visual effect as if an execution screen of a previously executed application is drawn into a position of the detected pressure, or a feedback generating vibration corresponding to a level of the detected pressure by using the motor.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed. At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions. The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

The invention claimed is:

1. An electronic device comprising:
a housing comprising a first surface facing in a first direction and a second surface facing in a second direction that is opposite to the first direction;
a touch screen display located between the first surface and the second surface and exposed through the first surface;
a biometric sensor located between the first surface and the second surface and exposed through the housing;
a pressure sensor located between the first surface and the second surface and configured to detect a pressure applied by an external object to the touch screen display;
a wireless communication circuit configured to transmit and receive a short-range radio signal;
at least one processor electrically connected to the touch screen display, the biometric sensor, the pressure sensor, and the wireless communication circuit; and
a memory electrically connected to the processor, the memory storing at least one application program configured to execute payment by transmitting a first signal by using the wireless communication circuit,
wherein the memory stores one or more instructions that are configured to, when executed, cause the processor to:
execute the application program;
receive biometric data by using the biometric sensor after executing the application program;
transmit the first signal by using the wireless communication circuit during a selected period after receiving the biometric data;
detect the pressure applied to the touch screen display during the selected period by using the pressure sensor; and
perform at least one of pause, resumption, or restart of transmission of the first signal at least partially based on the detected pressure when a selected pressure level is detected by the pressure sensor during the selected period.

2. The electronic device of claim 1, wherein the biometric sensor comprises a fingerprint sensor.

3. The electronic device of claim 1, wherein the selected pressure level comprises a first level and a second level that is different from the first level, and
the instructions are configured to cause the processor to:
pause transmission of the first signal upon detecting a pressure greater than or equal to the first level;
resume the transmission of the first signal whose the transmission is paused during a remaining period of the selected period upon detecting a pressure less than the first level; and
restart transmission of the first signal during the selected period upon detecting a pressure of a level greater than or equal to the second level.

4. The electronic device of claim 1, the instructions are configured to cause the processor to:
pause transmission of the first signal upon detecting a pressure greater than or equal to the selected pressure level; and
restart transmission of the first signal during the selected period upon detecting a pressure less than the selected pressure level.

5. An electronic device comprising:
a housing comprising a first surface facing in a first direction and a second surface facing in a second direction that is opposite to the first direction;
a touch screen display located between the first surface and the second surface and exposed through the first surface;
a pressure sensor configured to detect a pressure applied by an external object to the touch screen display;
at least one processor electrically connected to the touch screen display and the pressure sensor; and
a memory electrically connected to the processor, the memory storing at least one application program configured to execute at least one function regarding an image or a sound source,
wherein the memory stores one or more instructions that are configured to, when executed, cause the processor to:
  execute the application program;
  detect the pressure applied to the touch screen display by using the pressure sensor after executing the application program;
  pause execution of the at least one function at least partially based on identifying that the detected pressure corresponds to a selected pressure level; and
  resume or restart the at least one function whose execution is paused upon releasing of the detected pressure.

6. The electronic device of claim 5, wherein
the at least one function comprises a function to receive streaming data of the image or the sound source or data of a browser.

7. The electronic device of claim 6, wherein the instructions are configured to cause the processor to adjust a size of a buffer that stores the streaming data based on at least one of a duration of the pressure or a level of the pressure.

8. The electronic device of claim 6, wherein the instructions are configured to cause the processor to receive the streaming data of up to an amount corresponding to a position of the pressure.

9. The electronic device of claim 5, wherein the instructions are configured to cause the processor to:
  mute the image or the sound source based on a level of the detected pressure;
  detect an additional pressure applied to the touch screen display; and
  pause or restart playback of the muted image or sound source based on a level of the detected additional pressure.

10. An electronic device comprising:
a housing comprising a first surface facing in a first direction and a second surface facing in a second direction that is opposite to the first direction;
a touch screen display located between the first surface and the second surface and exposed through the first surface;
a pressure sensor configured to detect a pressure applied by an external object to the touch screen display;
at least one processor electrically connected to the touch screen display and the pressure sensor; and
a memory electrically connected to the processor, the memory storing at least one application program configured to execute at least one function regarding an image or a sound source,
wherein the memory stores one or more instructions that are configured to, when executed, cause the processor to:
  execute the application program;
  perform at least one operation based on a user input after executing the application program; and
  detect a pressure applied to the touch screen display by using the pressure sensor according to the user input and generate at least one bookmark for a play time of the image or sound source at least partially based on the detected pressure.

11. The electronic device of claim 10, wherein the instructions are configured to cause the processor to generate at least one file regarding at least one section of the image or the sound source based on the detected pressure, to generate at least one preview image regarding the section of the image based on the detected pressure, or to set at least one repeated play section regarding the image or the sound source based on the detected pressure.

12. An electronic device comprising:
a housing comprising a first surface facing in a first direction and a second surface facing in a second direction that is opposite to the first direction;
a touch screen display located between the first surface and the second surface and exposed through the first surface;
a pressure sensor configured to detect a pressure applied by an external object to the touch screen display;
at least one processor electrically connected to the touch screen display and the pressure sensor; and
a memory electrically connected to the processor, the memory storing a first application program and a second application program that is selected to be displayed in response to the pressure applied by the external object,
wherein the memory stores one or more instructions that are configured to, when executed, cause the processor to:
  display the first application program in at least a part of the touch screen display;
  detect the pressure applied to the touch screen display by using the pressure sensor; and
  display the second application program at least partially overlappingly with the first application program at least partially based on the detected pressure.

13. The electronic device of claim 12, wherein a different application program is designated to be executed for each level of the detected pressure,
and the instructions are configured to cause the processor to terminate displaying of the second application program upon release of the detected pressure.

14. The electronic device of claim 12, wherein the instructions are configured to cause the processor to:
  detect an additional pressure applied to the touch screen display; and
  maintain displaying of an execution screen of the second application program, even in case of release of the detected pressure at least partially based on the detected additional pressure.

15. The electronic device of claim 12, wherein the instructions are configured to cause the processor to:
  detect an additional pressure applied to the touch screen display; and
  display the second application program in an entire region of the touch screen display at least partially based on the detected additional pressure.

* * * * *